US012476428B2

(12) United States Patent
Mincey

(10) Patent No.: US 12,476,428 B2
(45) Date of Patent: Nov. 18, 2025

(54) WIRE TO WIRE JUNCTION CONNECTOR

(71) Applicant: KYOCERA AVX Components Corporation, Fountain Inn, SC (US)

(72) Inventor: Jackie Mincey, Fountain Inn, SC (US)

(73) Assignee: KYOCERA AVX COMPONENTS CORPORATION, Fountain Inn, SC (US)

( * ) Notice: Subject to any disclaimer, the term of this patent is extended or adjusted under 35 U.S.C. 154(b) by 507 days.

(21) Appl. No.: 17/950,833

(22) Filed: Sep. 22, 2022

(65) Prior Publication Data

US 2023/0087659 A1 Mar. 23, 2023

Related U.S. Application Data

(60) Provisional application No. 63/247,599, filed on Sep. 23, 2021.

(51) Int. Cl.
*H01R 24/64* (2011.01)
*H01R 13/6581* (2011.01)
(Continued)

(52) U.S. Cl.
CPC ......... *H01R 24/64* (2013.01); *H01R 13/6581* (2013.01); *H01R 24/54* (2013.01);
(Continued)

(58) Field of Classification Search
CPC .... H01R 24/64; H01R 13/6581; H01R 24/54; H01R 31/06; H01R 13/10; H01R 13/11;
(Continued)

(56) References Cited

U.S. PATENT DOCUMENTS 6,178,096 B1 1/2001 Sim et al.
6,547,593 B1 4/2003 Beckous
(Continued)

FOREIGN PATENT DOCUMENTS

CN 107834324 A * 3/2018 ............. H01R 27/02
JP 5114275 B2 1/2013
(Continued)

OTHER PUBLICATIONS

International Search Report and Written Opinion in PCT/US2022/044428 dated Mar. 3, 2023 (9 pages).
(Continued)

*Primary Examiner* — Justin M Kratt
(74) *Attorney, Agent, or Firm* — Foley & Lardner LLP

(57) ABSTRACT

A single pair Ethernet connector includes first and second housings, first and second electrical contacts, and a shield to encase the connected first and second housings. The first and second housings each include a first mating portion and a conjoined second mating portion, the first mating portion having a female interface on a first side and the second mating portion extending in a direction opposite the first side. The first and second electrical contacts each include a base having opposing first and second ends, a first portion extending from the first end, and a second portion extending from the second end. The female interface on the first side of the first housing receives the first portion of each of the first and second electrical contacts and the female interface on the first side of the second housing receives the second portion of each of the first and second electrical contacts.

8 Claims, 21 Drawing Sheets

(51) Int. Cl.

| | |
|---|---|
| ***H01R 24/54*** | (2011.01) |
| ***H01R 31/06*** | (2006.01) |
| *H01R 13/10* | (2006.01) |
| *H01R 13/11* | (2006.01) |
| *H01R 13/506* | (2006.01) |
| *H01R 13/627* | (2006.01) |
| *H01R 13/6582* | (2011.01) |
| *H01R 103/00* | (2006.01) |

(52) U.S. Cl.
CPC ............. *H01R 31/06* (2013.01); *H01R 13/10* (2013.01); *H01R 13/11* (2013.01); *H01R 13/112* (2013.01); *H01R 13/506* (2013.01); *H01R 13/627* (2013.01); *H01R 13/6582* (2013.01); *H01R 2103/00* (2013.01); *H01R 2201/04* (2013.01)

(58) Field of Classification Search
CPC ................ H01R 13/112; H01R 13/506; H01R 13/6582; H01R 2103/00; H01R 2201/04; H01R 13/627
See application file for complete search history.

(56) References Cited

U.S. PATENT DOCUMENTS

| | | | | |
|---|---|---|---|---|
| 10,164,383 | B2 | 12/2018 | Feng | |
| 11,031,719 | B2 | 6/2021 | Somanathapura Ramanna | |
| 11,061,719 | B2 | 7/2021 | Khadilkar et al. | |
| 11,469,552 | B2 | 10/2022 | Kim et al. | |
| 11,894,637 | B2 | 2/2024 | Pepe | |
| 11,929,568 | B2 | 3/2024 | Mincey | |
| 2003/0022547 | A1 | 1/2003 | Sukagawa | |
| 2009/0093166 | A1 | 4/2009 | Fogg et al. | |
| 2011/0255827 | A1 | 10/2011 | Schmidt et al. | |
| 2015/0214668 | A1 | 7/2015 | Qi et al. | |
| 2018/0175560 | A1 | 6/2018 | Zhang et al. | |
| 2018/0183183 | A1 | 6/2018 | Kelly et al. | |
| 2018/0323550 | A1 | 11/2018 | Brennan et al. | |
| 2019/0214746 | A1 * | 7/2019 | Zhang .................. | H01R 13/504 |
| 2020/0144735 | A1 | 5/2020 | Hata et al. | |
| 2020/0153174 | A1 | 5/2020 | Curtis et al. | |
| 2020/0388943 | A1 | 12/2020 | He | |
| 2021/0015905 | A1 | 1/2021 | Huang | |
| 2021/0151905 | A1 | 5/2021 | Novak et al. | |
| 2021/0249797 | A1 | 8/2021 | Lybrand | |

FOREIGN PATENT DOCUMENTS

| | | | |
|---|---|---|---|
| WO | WO-2017/082580 | A1 | 5/2017 |
| WO | WO-2019/165466 | A1 | 8/2019 |
| WO | WO-2021/067274 | A1 | 4/2021 |

OTHER PUBLICATIONS

International Search Report and Written Opinion in PCT/US2021/051759 dated Jan. 10, 2022 (9 pages).

* cited by examiner

WIRE TO WIRE JUNCTION CONNECTOR

CROSS-REFERENCE TO RELATED APPLICATIONS

This application claims priority to U.S. Provisional Patent Application No. 63/247,599, filed Sep. 23, 2021, the entire disclosure of which is incorporated herein by reference in its entirety, for any and all purposes.

FIELD

The present disclosure relates generally to the field of electrical connectors, and more particularly to a type of connector used to electrically connect one wire to another wire.

BACKGROUND

The following description is provided to assist the understanding of the reader. None of the information provided or references cited are admitted to be prior art.

Various connectors are used to form electrical connections between a wire and any manner of electronic or electrical component. These connectors may be sockets, plugs, or shrouded headers available in a vast range of sizes, pitches, and plating options. Traditionally, for two wires to be connected together, a user must strip the first and second wires, twist the two ends together, and then secure them to one other. This process can be tedious, inefficient, and undesirable for various electrical configurations. Furthermore, a wire-to-wire connection where stripped wires are connected may fail by falling apart or shorting out unexpectedly, which could be hazardous or even deadly. Accordingly, it would be advantageous to provide a quick, efficient, and reliable means of connecting and disconnecting wires.

SUMMARY

The systems, methods and devices of this disclosure each have several innovative aspects, no single one of which is solely responsible for the desirable attributes disclosed herein.

One aspect of the present disclosure relates to an electrical contact. The electrical contact includes a base having a first end and a second end opposite the first end, a first contact portion extending from the first end of the base, and a second contact portion extending from the second end of the base. The base further includes at least one retention feature and a first plane defined by the first and second contact portions is offset from a second plane defined by the base.

In various embodiments, the at least one retention feature comprises at least one of an aperture disposed through the base or a ridge extending from the base. In some embodiments, the at least one retention feature comprises at least one aperture disposed through the base and an elastic member. In other embodiments, each of the first contact portion and the second contact portion includes a single prong. In various embodiments, each of the first contact portion and the second contact portion includes two prongs. In some embodiments, the two prongs curve toward each other. In other embodiments, each of the first contact portion and the second contact portion are integrally formed respectively with the first end and the second end of the base. In yet other embodiments, the base is rectangular in shape.

Another aspect of the present disclosure relates to a single pair Ethernet (SPE) connector. The SPE connector includes a first housing and a second housing, a first electrical contact and a second electrical contact, and a shield configured to encase the connected first housing and second housing. Each of the first housing and the second housing includes a first mating portion and a conjoined second mating portion, the first mating portion having a female interface disposed on a first side and the second mating portion extending in a direction opposite the first side. Each of the first and second electrical contacts includes a base having a first end and a second end opposite the first end, a first contact portion extending from the first end of the base, and a second contact portion extending from the second end of the base. The female interface on the first side of the first housing is configured to receive the first contact portion of each of the first and second electrical contacts and the female interface on the first side of the second housing is configured to receive the second contact portion of each of the first and second electrical contacts.

In various embodiments, the base further includes at least one retention feature, and wherein a first plane defined by the first and second contact portions is offset from a second plane defined by the base. In some embodiments, the first mating portion includes a recess disposed within an upper portion of the first mating portion adjacent the second mating portion and a groove extending from the recess to the first side. In other embodiments, when the first and second contact portions of each of the first and second electrical contacts are respectively received within the female interface on the first side of each of the first housing and the second housing, the groove of the first mating portion of the first housing abuts the groove of the first mating portion of the second housing. In yet other embodiments, the shield includes a first retention feature disposed within a top portion of the shield at a first distance from a first end and a second retention feature disposed within the top portion of the shield at a second distance from a second end, and wherein the first retention feature is configured to engage with the recess of the first mating portion of the first housing and the second retention feature is configured to engage with the recess of the first mating portion of the second housing. In various embodiments, the shield further includes a third retention feature and a fourth retention feature disposed within a bottom portion of the shield, the third retention feature disposed at a third distance from the first end and the fourth retention feature disposed at a fourth distance from the second end. In some embodiments, each of the first retention feature and the second retention feature include at least one aperture disposed through the shield. In other embodiments, the shield has at least one flange disposed at each of a first end and a second end opposite the first end, the at least one flange configured to engage with a plug connector having a male mating interface.

Yet another aspect of the present disclosure relates to a method of forming a single pair Ethernet (SPE) connector. The method includes inserting each of a first electrical contact and a second electrical contact into a female interface of a first housing such that a first contact portion of each of the first and second electrical contacts is respectively received within a first opening and a second opening within the first housing, and inserting each of the first electrical contact and the second electrical contact into a female interface of a second housing such that a second contact portion of each of the first and second electrical contracts is respectively received within the first housing, wherein each of the first housing and the second housing include at least one recess. The method further includes enclosing the first housing and the second housing within a shield, the shield having a shape that is complementary to a shape of each of the first housing and second housing, wherein the shield includes a first retention feature at a first distance from a first end and a second retention feature at a second distance from a second end, and wherein the first retention feature engages with the recess of the first housing and the second retention feature engages with the recess of the second housing to retain the shield over the first and second housings.

In various embodiments, the method further includes forming the shield before enclosing the first housing and the second housing within the shield. Forming the shield includes providing a sheet material, the sheet material having at least two opposing edges, wherein a first of the two opposing edges has a first edge pattern and the second of the two opposing edges has a second edge pattern, the second edge pattern being complementary to the first edge pattern. Forming the shield also includes stamping one or more openings through the sheet material, the one or more holes forming at least one of the first retention feature or the second retention feature, and shaping the shield such that the shape of the shield is complementary to the shape of each of the first housing and the second housing. When the shield encloses the first housing and the second housing, the first edge pattern engages with the second edge pattern to retain the shield on the first housing and the second housing. In some embodiments, each of the first electrical contact and the second electrical contact includes a base having a first end and a second end opposite the first end, wherein the base further includes at least one centrally disposed retention feature, wherein the first portion extends from the first end of the base and the second portion extends from the second end of the base, and wherein a first plane defined by the first and second portions is offset from a second plane defined by the base. In other embodiments, enclosing the first housing and second housing within the shield includes inserting the first housing and the second housing into the shield at a first end.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Figure 2:
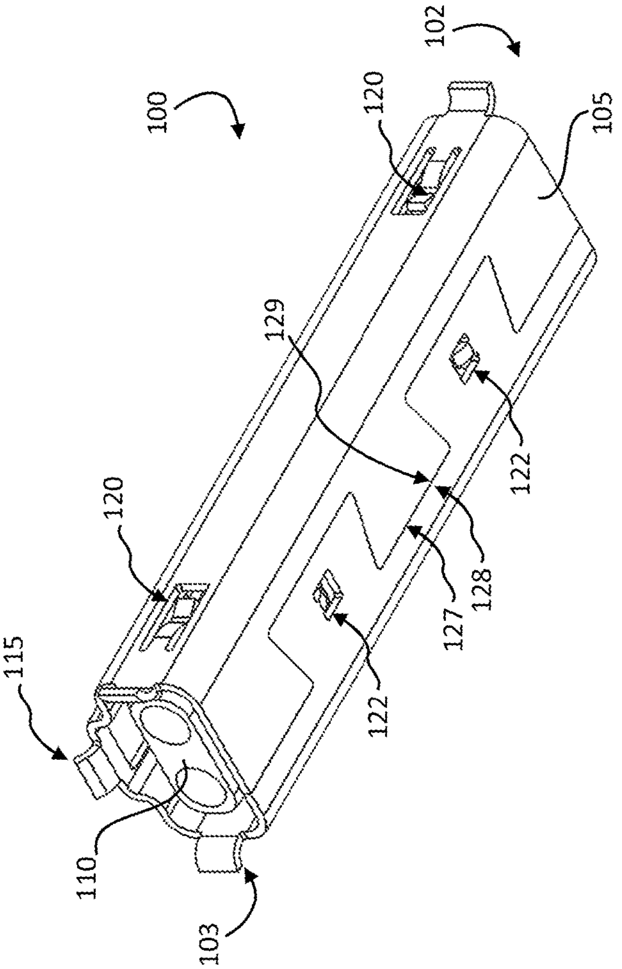
FIG. 2 is an alternate perspective view of the SPE connector of FIG. 1, according to an exemplary embodiment.
Figure 1:
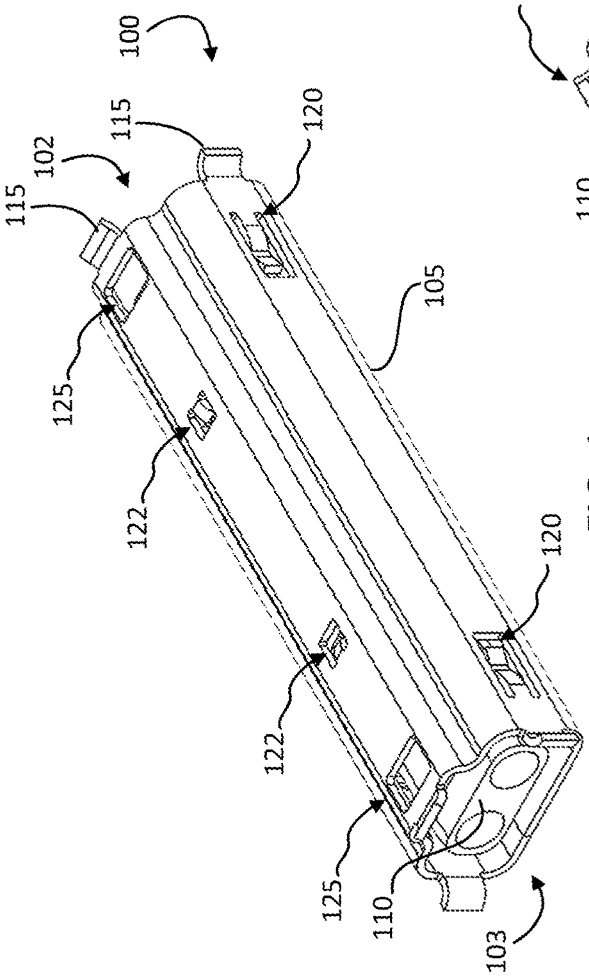
FIG. 1 is a perspective view of single pair Ethernet (SPE) connector, according to an exemplary embodiment.

Referring to FIGS. 1 and 2, top and bottom perspective views, respectively, of a wire to wire connector 100 are shown, according to an exemplary embodiment. In an embodiment, the wire to wire connector 100 is a single pair Ethernet (SPE) connection ("SPE connector"). The connector 100 is configured to facilitate wire to wire connection between two male connectors. The connector 100 has a first end 102 and a second end 103, where each of the first and second ends 102, 103 are configured to receive a male connector. The connector 100 includes a shield 105, which is adapted to enclose at least one housing 110, where the at least one housing 110 includes one or more electrical contacts, which facilitate the SPE connection.

As shown in FIGS. 1 and 2, the connector 100 includes one or more flanges or projections 115, which are disposed at each of the ends 102, 103 of the shield 105. The one or more flanges 115 are constructed to facilitate guiding the connector 100 onto male connectors. As shown, the shield 105 may also include various retention features, which are configured to couple to the at least one housing 110 to retain the at least one housing 110 within the shield 105. The shield 105 may include a first set of retention features 120 disposed along the sides of the shield 105 and a second set of retention features 122 disposed along the top and bottom of the shield 105. Each of the first and second sets of retention features 120, 122 may engage with one or more features of the at least one housing 110 to retain the at least one housing 110 within the shield 105. In addition, the shield 105 may include one or more slots, ports, apertures, or recesses 125, which may be disposed at the first and second ends 102, 103, and which are configured to facilitate coupling and retention of the connector 100 to one or more other connectors or electrical interfaces. The shield 105 also includes an interlocking interface 127, which is shown along the bottom portion of the shield 105 in FIG. 2. The interlocking interface 127 is formed by a first edge 128 of the shield 105 engaging with a second edge 129 of the shield 105. As shown, the first edge 128 includes a first edge pattern and the second edge 129 has a second edge pattern 129, which is complementary to the first edge pattern. For example, the interface 127 may include a tab and recess configuration. Accordingly, the first edge pattern of the first edge 128 engages with the second edge pattern of the second edge 129 at the interlocking interface 127, which prevents deformation of the shield 105 and/or disengagement of the shield 105 from the housings 110.

Figure 3:
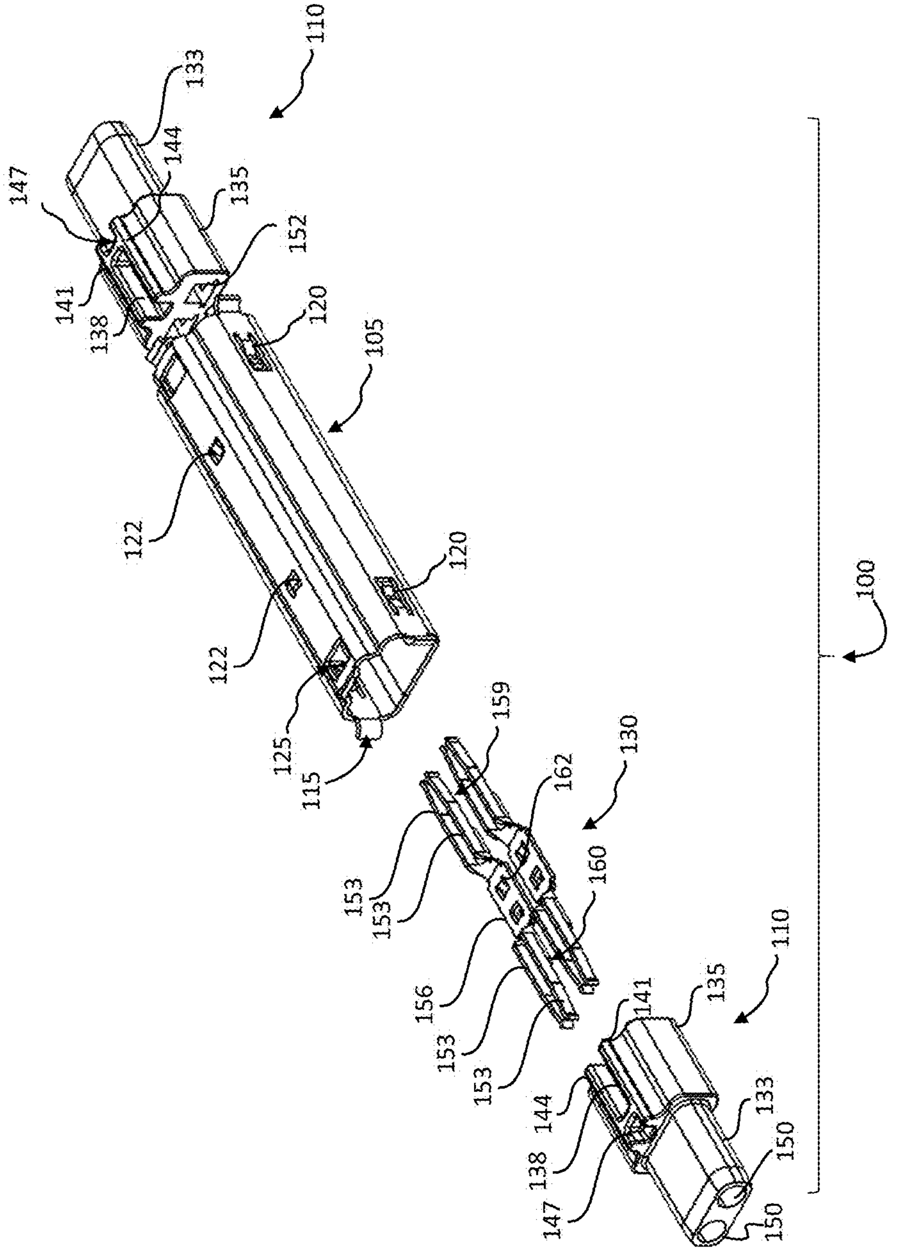
FIG. 3 is an exploded perspective view of the SPE connector of FIG. 1, according to an exemplary embodiment.

FIG. 3 shows an exploded perspective view of the connector 100, according to an exemplary embodiment. As shown, the connector 100 includes the shield 105, two housings 110, and two electrical contacts 130. To enable electrical connection between the connector 100 and one or more other electrical interfaces, the electrical contacts 130 are received within the housings 110, which are then enclosed within the shield 105. As illustrated in FIG. 3, the two housings 110 are arranged in an opposing disposition, where externally facing mating portions 133 of each of the housings 110 are positioned away from each other and inwardly facing mating portions 135 are positioned toward each other. The externally facing mating portions 133 of each of the housings 110 include a female interface and are respectively disposed near each of the ends 102, 103 of the connector 100 such that the externally facing mating portions 133 are configured to couple to an electrical connector having a male interface. The inwardly facing mating portions 135 of each of the housings, which are disposed to face each other, are each configured to receive the electrical contacts 130 therein.

As shown in FIG. 3, each of the housings 110 includes a groove 138, which is disposed within an upper portion of the inwardly facing mating portion 135. The groove 138 is defined between opposing ridges 141 and 144, and extends along the upper portion of the mating portion 135. A notch or recess 147 is also disposed within the upper portion of the mating portion 135 and is positioned adjacent the groove 138. In various embodiments, when the connector 100 is fully assembled, the grooves 138 of each of the housings 110 are configured to abut each other so as to form a continuous groove therebetween. In various embodiments, the groove 138 and the recess 147 within each of the housings 110 are configured to facilitate fit and retention within the shield 105. For example, each of the recesses 147 may engage with one or more protruding features disposed within the shield 105. In some embodiments, the groove 138 and the recess 147 within each of the housings 110 are based on manufacturing considerations including, but not limited to, preventing warping from excess shrinkage within the connector 100, providing mechanical support (e.g., increasing resistance to bending or torsion) within the connector 100, and/or reducing excess material within the connector 100. For example, each of the grooves 138 disposed within the housings 110 may be adapted to prevent heat sinks within the housings 110. In various embodiments, each of the housings 110 may be formed or constructed from one or more plastics, polymers, composites, or a combination thereof.

As shown in FIG. 3, each of the housings 110 includes two female mating interfaces 150 and 152, which are respectively disposed within the mating portions 133 and 135. The mating interface 150 is disposed within an outwardly facing side of the mating portion 133 and is configured to receive a male mating interface from an electrical connector. The mating interface 152 is disposed within an inwardly facing side of the mating portion 135 and is configured to receive the electrical contacts 130. Each of the electrical contacts 130 includes a base 156, which is disposed between opposing contact portions 159 and 160. Accordingly, the contact portions 159 and 160 extend outwardly from opposite ends of the base 156 such that the contact portion 159 extends from a first side of the base 156 and the contact portion 160 extends from a second side of the base 156, where the second side is opposite the first side. Each contact portion 159, 160 includes one or more prongs or tines 153, which are adapted to be received within the mating interfaces 152 of each of the housings 110. Accordingly, each of the prongs 153 of each contact portion 159, 160 are received within the mating interfaces 152 disposed within the mating portions 135 of each of the housings 110. Thus, when the connector 100 is assembled, one of the housings 110 is coupled to the first contact portions 159 of each of the contacts 130 and the other of the two housings 100 is coupled to the second contact portions 160 of each of the contacts 130. In various embodiments, each of the electrical contacts 130 may include one or more protruding retention features 162 disposed within the base 156, which may be configured to facilitate retention of the contacts 130 within the housings 110. In various embodiments, the outer edges of the base 156 may prevent over-insertion of the prongs 153 into the mating interfaces 152 (e.g., by making contact with or abutting against one or more features within the housings 110).

Figure 5:
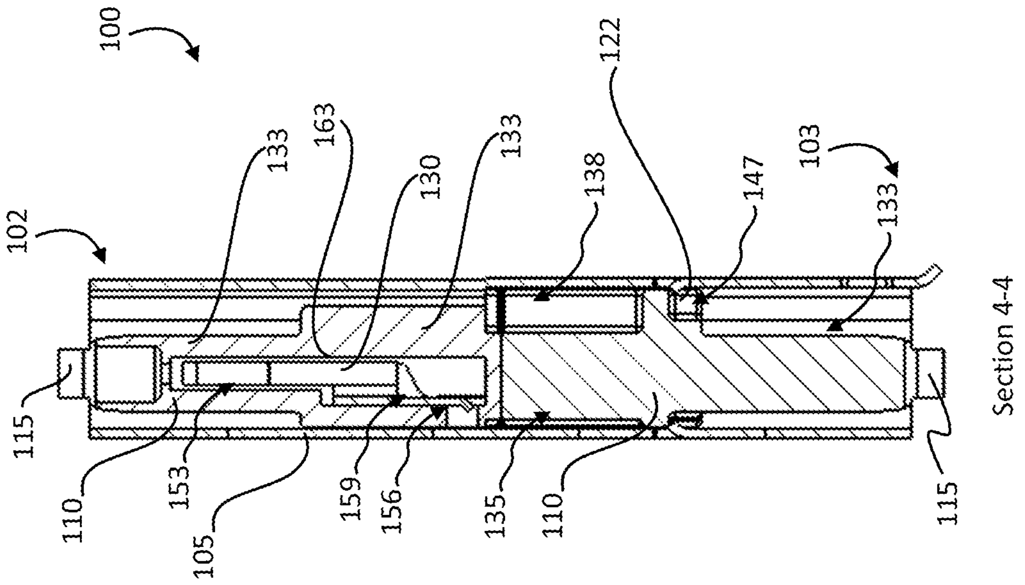
FIG. 5 is a sectional view of the SPE connector of FIG. 4 taken along line 4-4 of FIG. 4, according to an exemplary embodiment.
Figure 4:
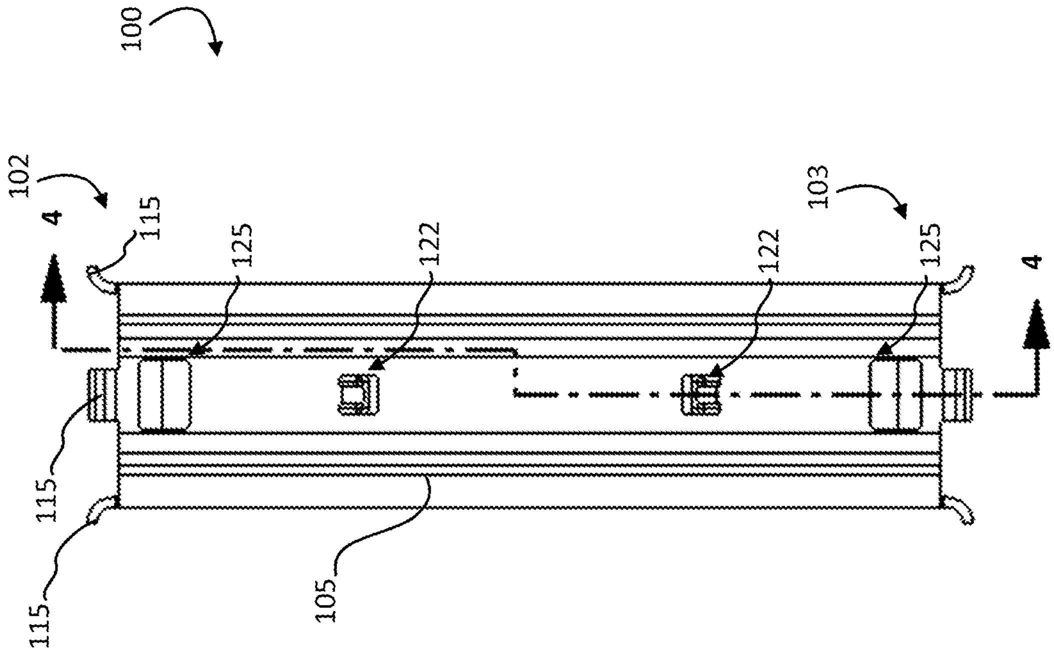
FIG. 4 is a top view of the SPE connector of FIG. 1, according to an exemplary embodiment.

FIGS. 4 and 5 show top and sectional views, respectively, of the connector 100, according to an exemplary embodiment. As illustrated in FIG. 4, when the connector 100 is assembled, the housings 110 are positioned such that the outer mating interfaces 150 are included within the shield 105 (i.e., do not protrude past the edges of the shield 105). In addition, each of the flanges 115 may extend outward from the shield 115, which may help guide coupling of the connector 100 to one or more wires, electrical connectors or interfaces, etc. As shown, each of the flanges 115 may bent or curved such that each flange extends away from an outer surface defined by the shield 105. In various embodiments, each of the flanges 115 may extend outward from the shield 105 in a first direction substantially parallel with a length of the shield 105 (i.e., extending past the ends 102, 103 in a generally horizontal direction) and in a second direction substantially perpendicular with the length of the shield 105. In various embodiments, a length, width, and/or degree of curvature of each of the flanges 115 may be based on a length of the connector 100 and/or based on a thickness of the material used to produce the shield 105. When assembled, the various components of the connector 100 are configured to mutually engage so as to prevent disassembly of the connector 100 during use. In yet other embodiments, the shield 105 may be formed without the flanges 115. As shown in FIG. 5, which is a sectional view of the connector 100 taken along line 4-4 of FIG. 4, the housings 110 are arranged within the connector 100 such that the mating portions 135 of each housing 110 are abutting, and the mating portions 133 are positioned at the ends 102 and 103 of the connector 100. The housings 110 are retained within the shield 105 by the retention features 122, which may engage with the recesses 147 disposed within the housings 110. As shown, the housings 110 also include an internal channel 163 (which extends from the mating interface 152 disposed within the mating portion 135). Accordingly, when the connector 100 is assembled, the prongs 153 are disposed within the internal channel 163 such that when another wire or connector having a male interface is coupled to the connector 100 via the mating interface 150, the prongs 153 facilitate an electrical connection therebetween.

Figure 6:
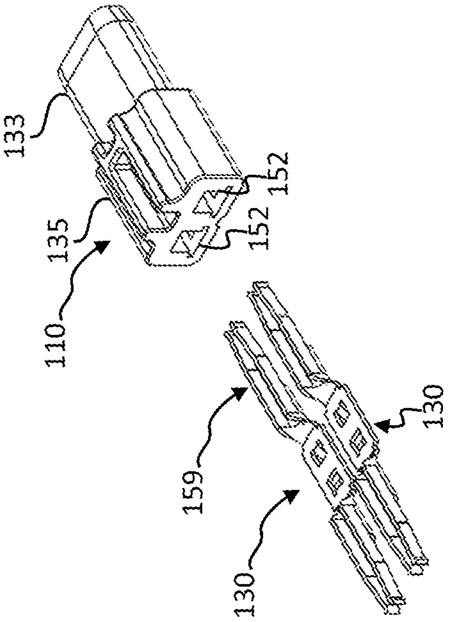
FIGS. 6-11 show perspective views of assembly stages for the SPE connector of FIG. 1, according to an exemplary embodiment.
Figure 7:
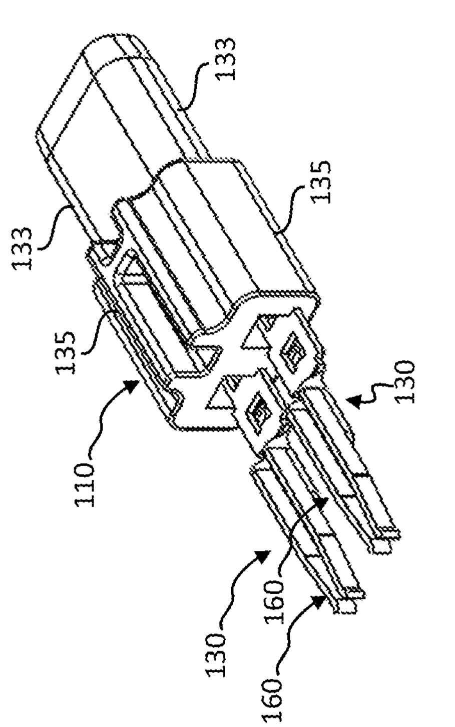
Figure 8:
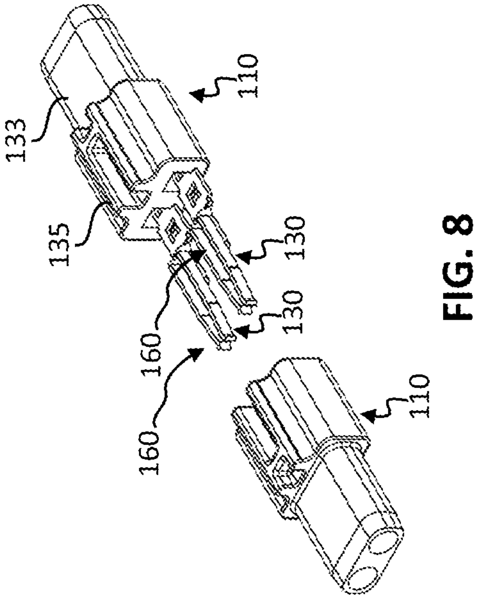
Figure 9:
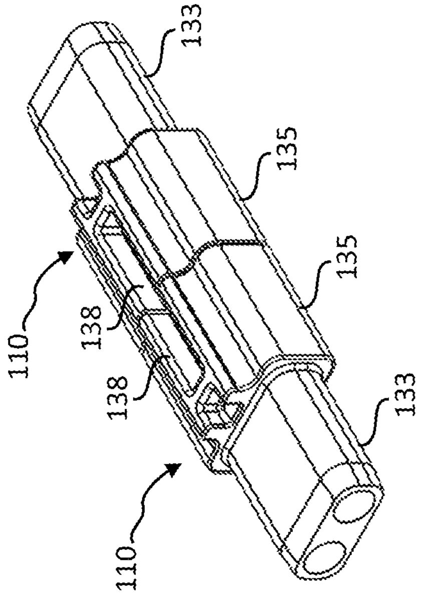
Figure 11:
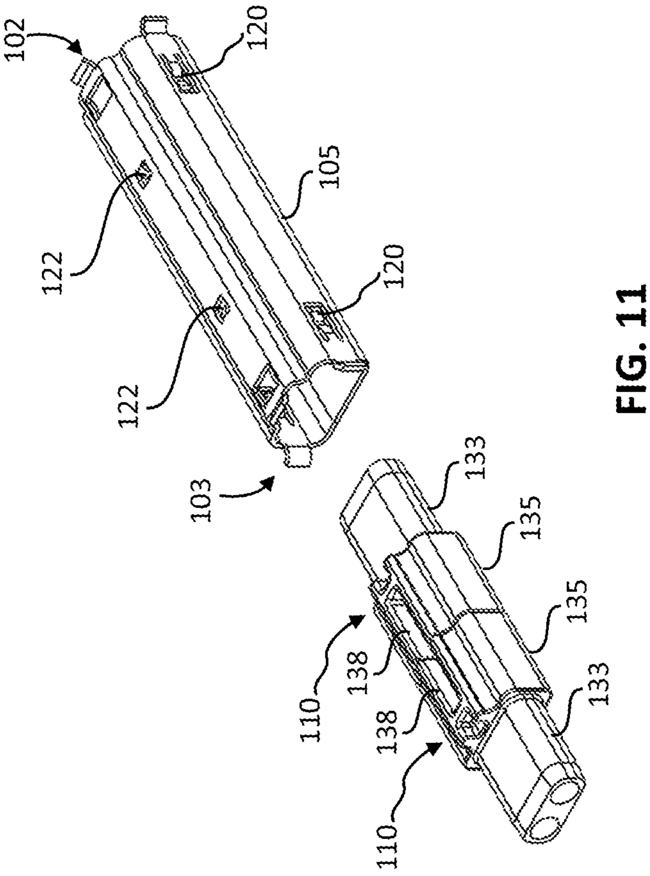
Figure 10:
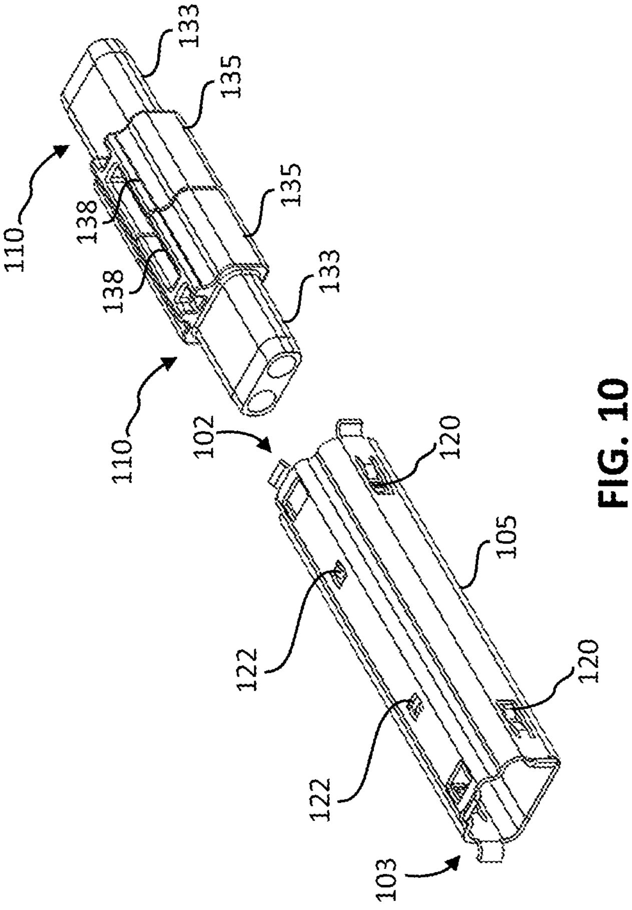

In various embodiments, the connector 100 may be assembled in a modular fashion. FIGS. 6-11 show stages of assembling the connector 100, according to an exemplary embodiments. As shown in FIG. 6, two electrical contacts 130 are positioned relative to a housing 110 such that the contact portions 159 (or alternatively, the contact portions 160) of each contact 130 are aligned with the mating interface 152. Once aligned, the contact portions 159 of each of the electrical contacts 130 are inserted into the mating portion 135 of the housing 110 via the mating interface 152, as shown in FIG. 7. After the contact portions 159 of each electrical contact 130 are inserted into the housing 110, the contact portions 160 of each electrical contact 130 may then be aligned with the mating interface 152 of a second housing 110, as shown in FIG. 8. Once aligned, the contact portions 160 of the at least one electrical contact 130 are inserted into the mating portion 135 of the second housing 110 via the corresponding mating interface 152, as shown in FIG. 9. As shown, when the electrical contacts 130 are inserted into both housings 110, the mating portions 135 (and the groove 138 disposed therein) of each housing 110 are directly adjacent such that they may physically contact each other. Once the electrical contacts 130 are inserted into both housings 110, the resulting assembly may then be inserted into the shield 105 at either of the ends 102, 103, as shown in FIGS. 10 and 11. In various embodiments, the connector 100 is held together by the housings 110. In some embodiments, the mating interfaces 152 of each of the mating portions 135 may be configured such that the electrical contacts 130 are friction-fit or press-fit therein. Additionally or alternatively, the shield 105 is configured to prevent disengagement of the connector 100 components, such as via a friction-fit between an inner surface of the shield 105 and an outer surface of the housings 110. In other embodiments, the retention features 122 of the shield 105 may engage with the housings 110 and prevent disengagement thereof.

Figure 13:
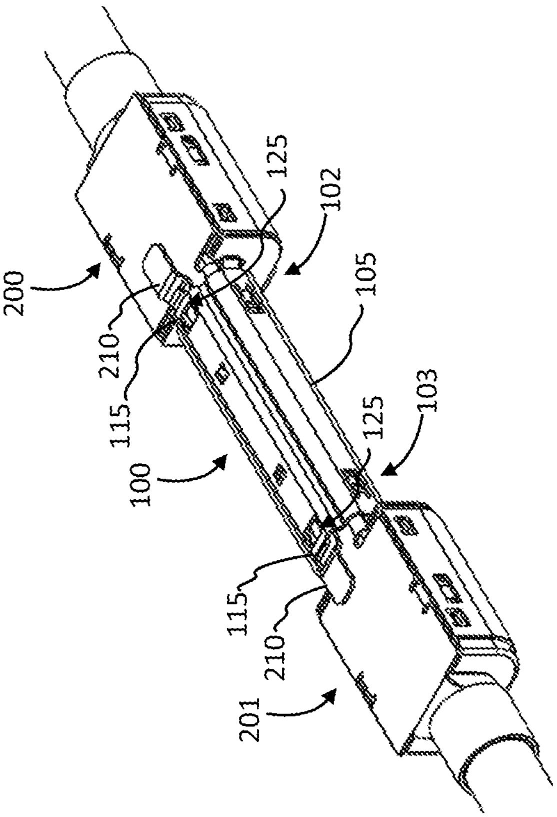
FIGS. 12-13 show top and bottom perspective views, respectively, of stages of connecting the SPE connector of FIG. 1 between two plug connectors, according to an exemplary embodiment.
Figure 12:
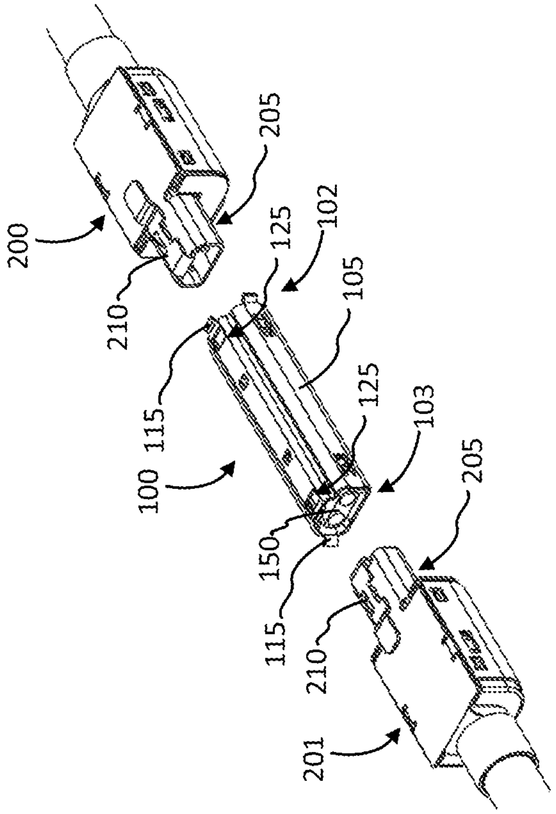

Once assembled, the connector 100 may then be used to facilitate connection between two wires or connectors having male interfaces. As shown in FIG. 12, the ends 102, 103 of the assembled connector 100 may be aligned with male interfaces 205 of first and second plug connectors 200, 201 (e.g., from an SPE cable). Accordingly, the male interface 205 of the first plug connector 200 may be aligned with the first end 102 of the connector 100 and the male interface 205 of the second plug connector 200 may be aligned with the second end 103 of the connector 100. Once aligned, the male interfaces 205 of each plug connector 200, 201 may respectively engage with the female interfaces 150 of each housing 110 disposed on each of the ends 102, 103 of the connector 100. Once the connector 100 and the plug connectors 200, 201 are connected, as shown in FIG. 13, protruding features 210 disposed on, near, or adjacent to the male interfaces 205 may engage with the recesses 125 disposed near each of the ends 102, 103 to prevent disengagement of the connector 100 from the plug connectors 200, 201. In various embodiments, the retention features 120 of the shield 105 may facilitate retention (e.g., via friction fit) of the plug connectors 200, 201 within the connector 100.

Figure 16:
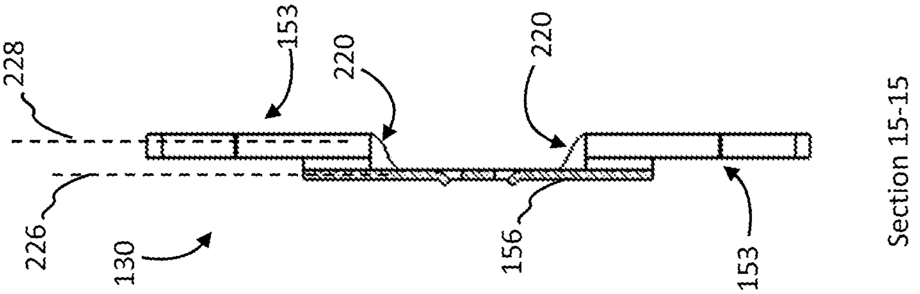
FIG. 16 is a sectional view of the electrical contact of FIG. 15 taken along line 15-15 of FIG. 15, according to an exemplary embodiment.
Figure 15:
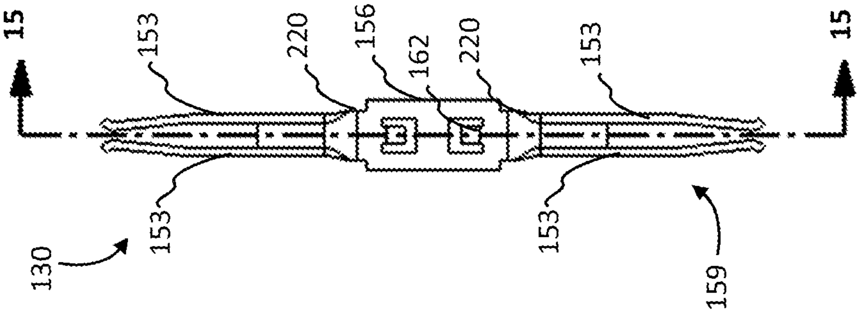
FIG. 15 is a top view of an electrical contact included within the SPE connector of FIG. 1, according to an exemplary embodiment.
Figure 14:
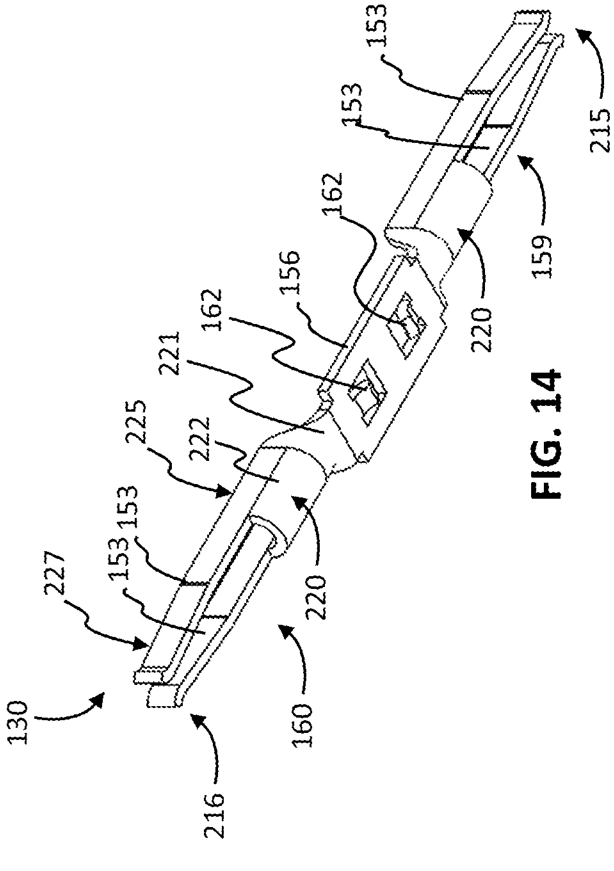
FIG. 14 shows a perspective view of two electrical contacts included within the SPE connector of FIG. 1, according to an exemplary embodiment.
Figure 17:
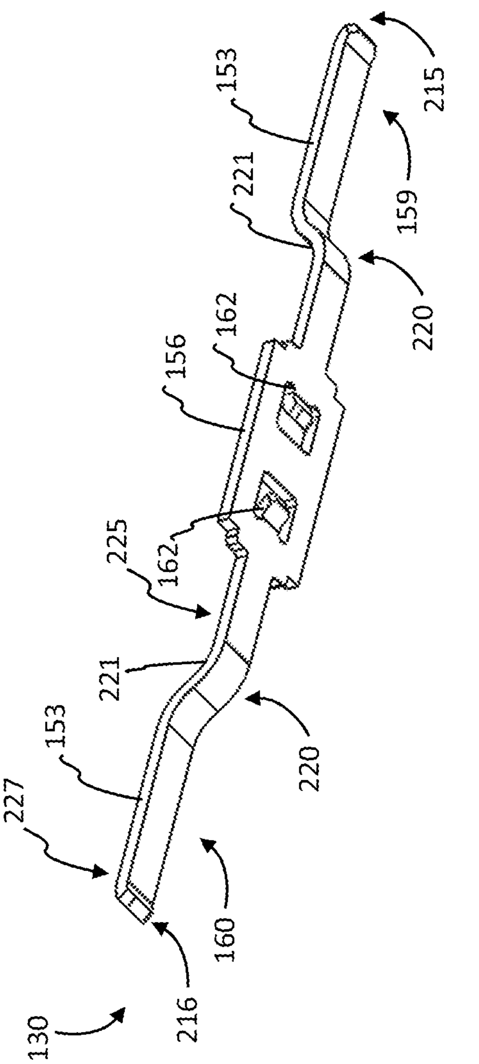
FIG. 17 is a perspective view of an electrical contact having a single prong, according to an exemplary embodiment.
Figure 18:
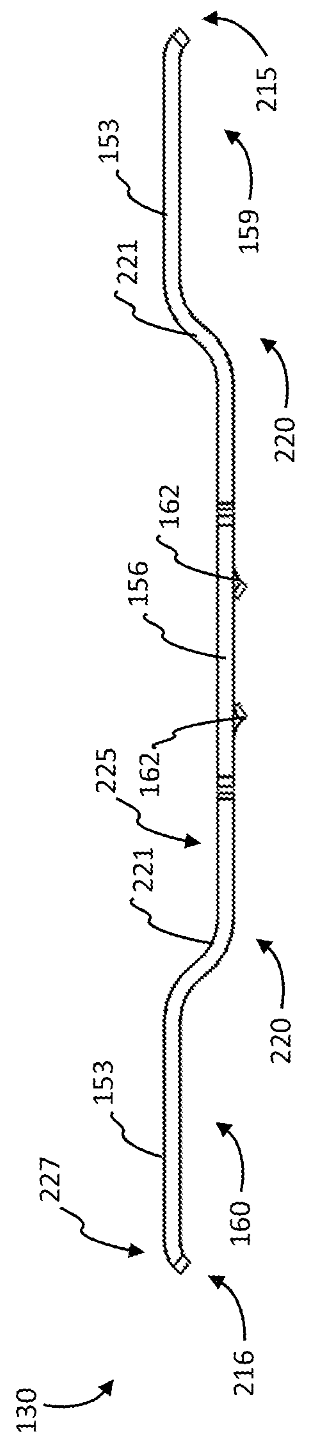
FIG. 18 is a side view of the electrical contact of FIG. 17, according to exemplary embodiment.

FIGS. 14-16 show perspective, top, and sectional views, respectively, of the electrical contact 130, according to an exemplary embodiment. As shown, each of the prongs 153 within each contact portion 159, 160 is integrally formed with the base 156 via transition sections 220. In various embodiments, the transition sections 220 may be curved, angled, or contoured such that a plane 228 defined by the prongs 153 within each respective contact portion 159 and 160 are offset from a plane 226 defined by the base 156. In various embodiments, the contact portions 159 and 160 may define two separate planes, which are further offset from each other. As shown in FIG. 14, each transition section 220 includes an inclined portion 221, which is generally angled upward from the base 156. The inclined portion 221 is integrally formed with a U-shaped portion 222, where opposing edges of the transition section 220 are curved inward toward each other. In some embodiments, an amount of offset between the planes 226 and 228 may be based on a housing configuration. In other embodiments, the amount of offset may be based on a type of SPE (or other connector type) connection (e.g., an SPE connection according to standard IEC 63171-6, etc.). In various embodiments, the electrical contact 130 may include at least one prong 153 disposed within each contact portion 159 and 160. Although FIGS. 14-16 show the electrical contact including two prongs 153 within each contact portion 159, 160, the electrical contact 130 may include a single prong 153, three prongs 153, or any number of prongs 153. For example, FIGS. 17 and 18 show perspective and side views of a single-pronged electrical contact 130. Each prong 153 may be curved or contoured to facilitate ease and robustness of electrical connectivity. As shown in FIGS. 14 and 15, each prong 153 may include a first portion 225 (e.g., a proximal portion), which is substantially parallel with the outer edges of the base 156, and a second portion 227 (e.g., a distal portion further from the base than the proximal portion 225), which is configured to curve inward toward a central axis (width-wise) of the electrical contact 130. Accordingly, as shown in FIGS. 14 and 15, within each contact portion 159 and 160, the two prongs 153 curve or bend inward towards each other. Each of the contacts 130 may be produced by first stamping a sheet of electrically conductive material (e.g., metal or metallic alloy), bending the first and second contact portions 159, 160 to be offset from the base 156 (thus forming the inclined portions 221), and folding the prongs 153 within each of the contact portions 159, 160 (thus forming the U-shaped portions 222) such that the prongs 153 are in a mirroring configuration relative to a lengthwise central axis of the electrical contact 130. In some embodiments, terminal ends 215, 216 of the prongs 153 may be curved outward (i.e., away from a longitudinal axis of the contact 130) to facilitate retention and/or engagement within the housings 110.

The single-pronged electrical contacts 130 shown in FIGS. 17 and 18 may be formed similarly to the electrical contacts 130 shown in FIGS. 14 and 15—e.g., by stamping and/or cutting processes. Similar to the contacts 130 shown in FIGS. 14 and 15, each prong 153 of the contacts 130 shown in FIGS. 17 and 18 may be bent such that both the first portion 225 and the second portion 227 are substantially parallel to the base 156. The first portion 225 may be substantially coplanar with the base 156 and the second portion 227 may be offset from the first portion 225 such that the second portion is disposed in a plane that is offset from a plane defined by the base 156. As shown in FIGS. 17 and 18, the first and second portions 225, 227 are connected with transition sections 220, where each of the transition sections 220 includes an inclined portion 221, which is inclined, bent, or otherwise contoured such that a first end of the inclined portion 221 is disposed in a different plane than a second opposite end of the inclined portion 221. In various embodiments, each of the transition sections 220 may have a stepped configuration. As shown in FIGS. 17 and 18, each of the prongs 153 (i.e., the second portions 227 of the each of the prongs 153) is substantially flat and is configured to be inserted into the housings 110 (i.e., via the mating interfaces 152) in a substantially horizontal orientation, instead of in a substantially vertical orientation as with the prongs 153 of the contacts 130 shown in FIGS. 14 and 15. In some embodiments, the terminal ends 215, 216 of the prongs 153 of the contacts 130 shown in FIGS. 17 and 18 may be curved such that the terminal ends 215, 216 are pointed downward toward the plane defined by the base 156. In some embodiments, the curved terminal ends 215, 216 facilitate retention and/or engagement within the housings 110. As described above, the electrical contact 130 (in all embodiments shown in FIGS. 14-18) may include one or more retention features 162 disposed within the base 156 to prevent or resist disengagement of the electrical contact 130 from the housings 110. In various embodiments, the one or more retention features 162 may be formed by cutting or stamping a tab from the base 156, and forming (e.g., bending, warping, etc.) said tab to be protruding from the base 156, as shown in FIG. 14. In various embodiments, the one or more retention features 162 may be generally rectangular in shape and may be bent or curved downward from the base 156. In other embodiments, the one or more retention features 162 may be rounded. In yet other embodiments, the one or more retention features 162 may be integrally formed within the base 156 as one or more bumps, ridges, or protrusions. Although FIG. 14 shows the base 156 having two retention features 162, various embodiments of the electrical contact 130 may include any number (e.g., one, three, four, six, etc.) of retention features 162 disposed within the base. In various embodiments, the retention features 162 may be centrally disposed (lengthwise) within the base 156. In other embodiments, the retention features 162 may be symmetrically arranged about a central axis of the base 156, where the central axis is defined in a direction perpendicular to a lengthwise axis defined by the contact portions 159, 160.

Figure 20:
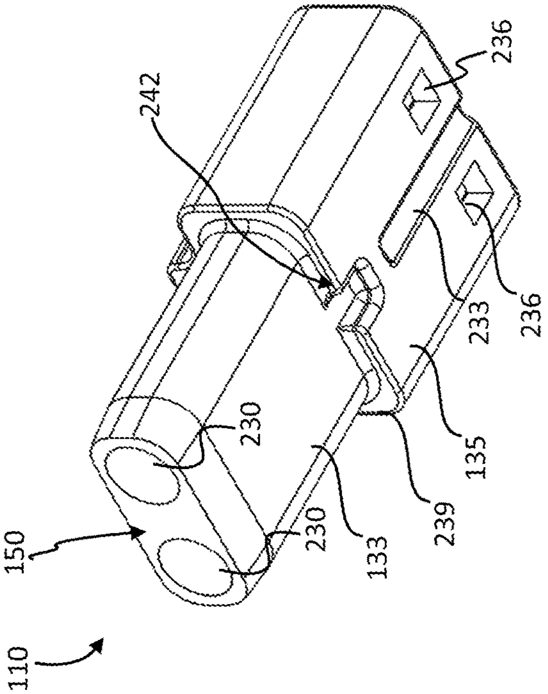
FIGS. 19-21 are alternate perspective views of a housing included within the SPE connector of FIG. 1, according to an exemplary embodiment.
Figure 19:
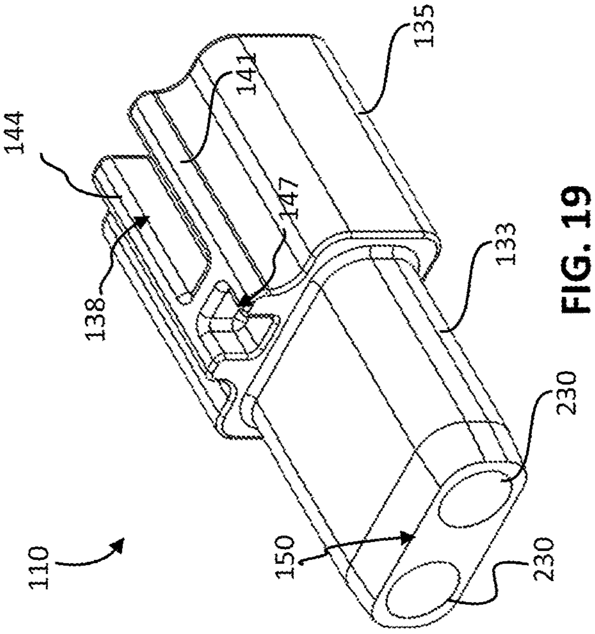
Figure 21:
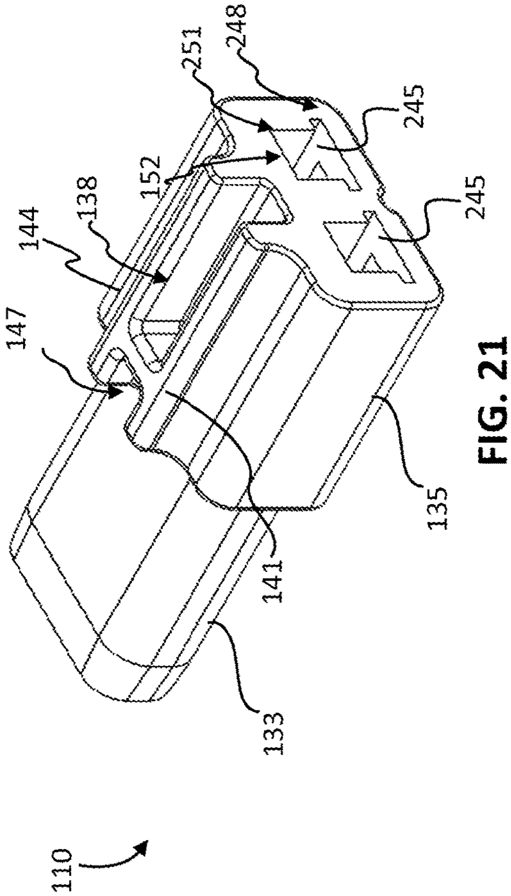
Figure 25:
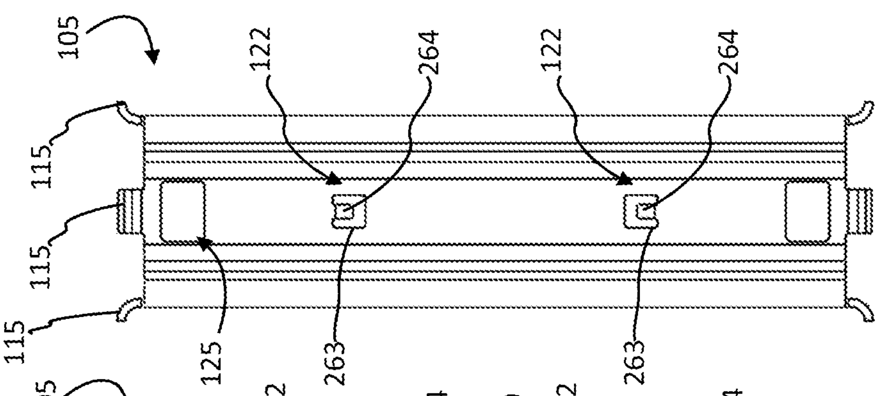
FIGS. 23-25 are side, top, and bottom views, respectively, of the shield of FIG. 22, according to an exemplary embodiment.
Figure 24:
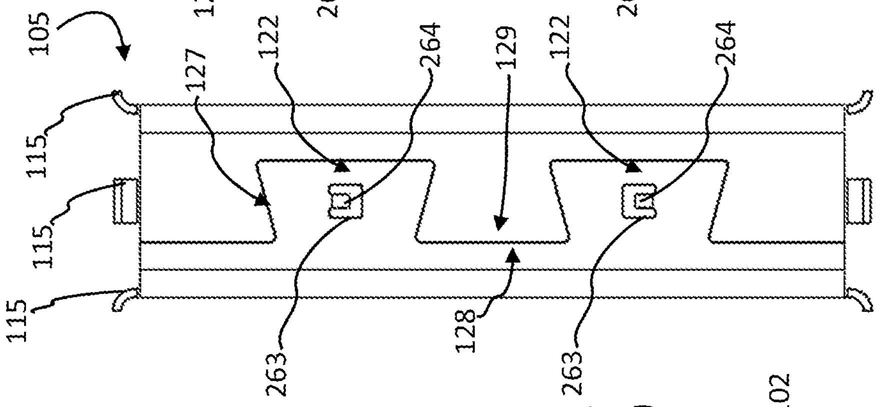

FIGS. 19-21 show alternate perspective views of the housing 110, according to an exemplary embodiment. As described previously, the housing 110, which is configured to electrically insulate the electrical contacts 130, includes two mating portions 133, 135, which each have the corresponding mating interfaces 150 and 152, respectively. The mating interface 150 may include one or more recesses or orifices 230, which are each configured to receive a male interface (or portion thereof) from another wire, electrical connector, or interface (e.g., plug connector 200 or 205). Although FIGS. 19-21 show the orifices 230 as generally cylindrical in shape, the orifices 230 may have any suitable shape for receiving a male interface or male interface portion therein. Similarly, the mating interface 150 within the mating portion 135 of the housing may include one or more recesses or orifices 245, which are configured to receive the electrical contact 130. To accommodate both the prongs 153 and the base 156 of the electrical contact 130, each orifice 245 within the mating interface 152 may include a thin slot 248, which is shaped to receive a portion of the base 156. The orifice 245 may also include a second slot 251, which is disposed directly above the slot 248, and which has a smaller width and greater height than the slot 248 to facilitate receiving the prongs 153 of the electrical contact 130. In various embodiments, the orifices 245 may be sized, shaped, or positioned in any suitable manner necessary to enable insertion of the electrical contacts 130 for facilitating an SPE connection using the connector 100. In various embodiments, a thickness of the electrical contact 130 material may be approximately 0.25 inches. In other embodiments, the thickness of the electrical contact 130 may be based on desired radiofrequency (RF) capabilities.

The housing 110 may also be sized or shaped to facilitate ease of connection between the connector 100 and one or more plug connectors (e.g., connectors 201, 202), and to facilitate retention of the housing 110 within the shield 105. As illustrated in FIG. 20, the housing 110 may include one or more recesses 236 disposed with a bottom portion of the mating portion 135, which may be configured to receive or engage with one or more protruding portions of the shield 105. For example, the retention features 122 disposed within the bottom portion of the shield 105 may engage with the recesses 236 of the housing 110. In addition, the housing 110 may be shaped such that the mating portion 135 is greater in width and/or height as compared to the mating portion 133. Accordingly, the mating portions 133 and 135 may form a ridge 239 therebetween, where the ridge 239 may include one or more notches 242, which may facilitate ease of placement or retention within the shield 105. In various embodiments, the housing 110 may be produced via molding, thermoforming, or any other suitable fabrication method. In various embodiments, the mating portions 133, 135 and the ridge 239 may be formed based on one or more International Electrotechnical Commission (IEC) standards (e.g., IEC spec 63171-6).

Figure 22:
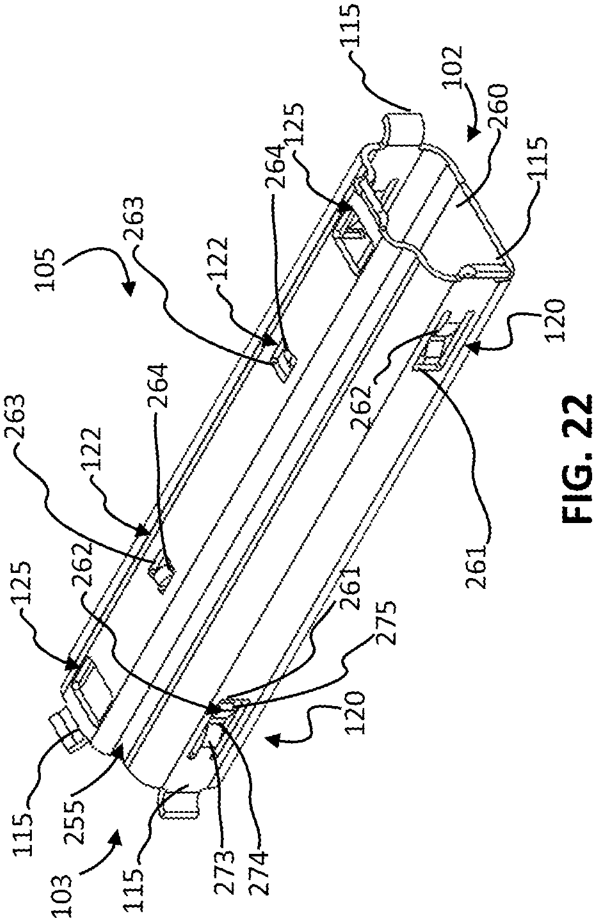
FIG. 22 is a perspective view of a shield included within the SPE connector of FIG. 1, according to an exemplary embodiment.
Figure 23:
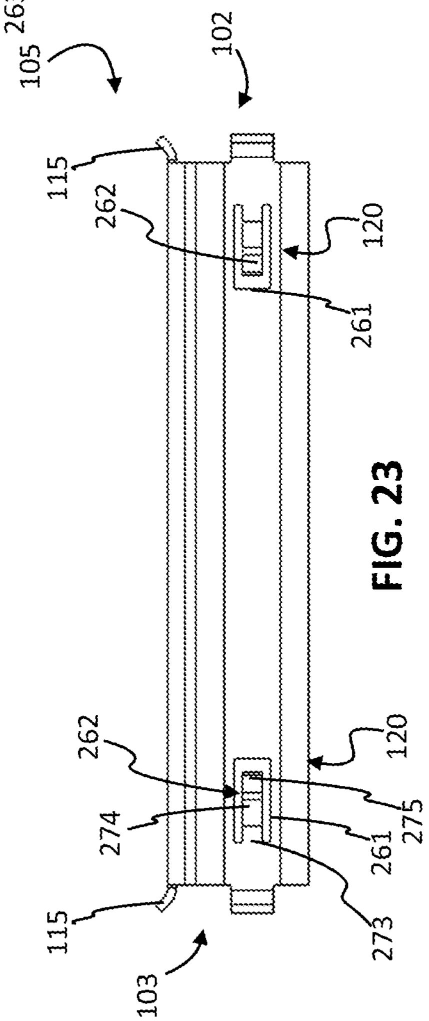

FIGS. 22-25 show perspective, side, bottom, and top views of the shield 105, according to an exemplary embodiment. As described above, the shield 105 is configured to enclose the housings 110 and electrical contacts 130. The shield 105 is generally formed as a tubular structure having a central bore 260, and terminating at the opposing ends 102 and 103. The shield 105 may have a generally rectangular shape. In various embodiments, the shield 105 may be contoured to conform or be generally complementary to a shape of the housings 110, which are enclosed therein. As shown in FIG. 22, the shield 105 may include one or more curved region 255, which are formed to match a contour of the housings 110. The shield 105 may be produced by cutting sheet material (e.g., metal or metallic alloy) to a predetermined size, forming retention features 120, 122, and recesses 125 by stamping or cutting, and forming the sheet material into the desired shape (i.e., where the desired shape matches the shape and/or contour of the housings 110). Terminal ends of the shield 105 may be cut or otherwise modified to form an interlocking pattern. As described above, the shield 105 includes an interlocking interface 127. The interlocking interface 127 is formed by the first edge 128 of the shield 105 engaging with the second edge 129 of the shield 105. As shown, the first edge 128 includes a first edge pattern and the second edge 129 has a second edge pattern 129, which is complementary to the first edge pattern. Accordingly, the first edge pattern of the first edge 128 engages with the second edge pattern of the second edge 129 at the interlocking interface 127, which prevents deformation of the shield 105 and/or disengagement of the shield 105 from the housings 110. For example, because the shield 105 may be formed from sheet metal, the shield 105 may be subject to an amount of spring-back (or other internal stresses) that could cause the shield 105 to deform or become misshapen. Accordingly, the interlocking pattern formed between the edges 128, 129 prevents the shield 105 from separating at the edges 128, 129 and ensures that the shield 105 retains a shape and structure complementary to that of the housings 110.

As described above, the retention features 120, 122 and the recesses 125 may be stamped or cut within the shield 105. In various embodiments, the retention features 120 and/or 122 may include one or more formed elastic members, which are configured to apply a compressive force on the housings 110 contained within the shield 105 to prevent sliding or dislodging of the housings 110. In various embodiments, the retention features 120 and/or 122 may additionally or alternatively include one or more protruding portions, which are adapted to engage with corresponding recesses (e.g., recesses 147, 236) within the housings 110. In various embodiments, the retention features 120 may be configured to engage with one or more retention features of another connector coupled to the connector 100 (e.g., the connectors 201, 202). For example, the retention features 122 may engage with the housings 110 within the shield 105, and the retention features 120 may engage with the connectors 201, 202 to prevent disengagement of the connector 100 from the connectors 201, 202.

As shown in FIGS. 22-25, the retention features 120 may be formed by cutting or stamping to produce a tab or cantilevered portion 262 extending from a surface 261 on the side of the shield 105. Each cantilevered portion 262 within each of the retention features 120 may be formed to have a first region 273, which is bent or curved inward away from the surface 261 and into the bore 260. The first region 273 may be integrally formed with a second region 275, which is bent or curved outward toward the surface 261 and away from the bore 260. An intermediate region 274 is disposed between the first and second regions 273, 275, where the intermediate region 274 is disposed closer to a center of the bore 260 compared to either of the first and second regions 273, 275. In various embodiments, the cantilevered portion 262 may be preloaded or otherwise configured such that the intermediate region 274 is configured to apply a compressive force on the housings 110 when the connector 100 is assembled, or on the plug connectors 201, 202 when the connector 100 is coupled thereto. In various embodiments, the retention features 120 may be configured to engage with one or more corresponding recesses disposed within the plug connectors 201, 202 such that when the connector 100 is coupled to the plug connectors 201, 202, the retention features 120 may prevent disengagement. In some embodiments, the retention features 120 may also facilitate disengagement of the plug connectors 201, 202 from the connector 100. For example, when the connector 100 is coupled to the plug connectors 201, 202, the second region 275 within each retention feature may be pressed to release engagement between the retention features 120 and the plug connectors 201, 202 and the retention features 120.

As shown in FIGS. 22-25, the retention features 122 may be formed by cutting or stamping to produce a tab or cantilevered portion 264 extending from a surface 263 defined by a top (or bottom) of the shield 105. Each cantilevered portion 264 within each of the retention features 122 may be bent or curved inward away from the surface 263 and into the bore 260. A distal end of the cantilevered portion 264 furthest from the surface 263 may engage with the recess 147, which is disposed within each housing 110. In various embodiments, the cantilevered portions 264 may be shaped to prevent disengagement of the housings 110 from the shield 105 once the connector 100 is assembled. In various embodiments, each of the top and bottom of the shield 105 may include two retention features 122 (as shown). In other embodiments, each of the top and bottom of the shield 105 may include any number (e.g., two, four, six, nine, etc.) of retention features 162.

In various embodiments, the retention features 120 may be disposed at a same distance from the ends 102, 103 as the retention features 122. In other embodiments, each retention feature 120 may be disposed at a first distance from the ends 102, 103, and each retention feature 122 may be disposed at a second distance from the ends 102, 103. In yet other embodiments, a distance between the end 102 and a closest retention feature 120 and/or 122 may be different than a distance between the end 103 and a closest retention feature 120 and/or 122. For example, the retention feature 120 (or the retention feature 122) nearest the end 103 may be disposed at a distance that is greater or less than a distance between the retention feature 120 (or the retention feature 122) nearest the end 102 and the end 102. In various embodiments, the shield 105 may be additionally or alternatively configured to engage with plug connectors coupled to the connector 100 (e.g., plug connectors 201, 202) via the recesses 125 and/or the flanges 115.

Figure 27:
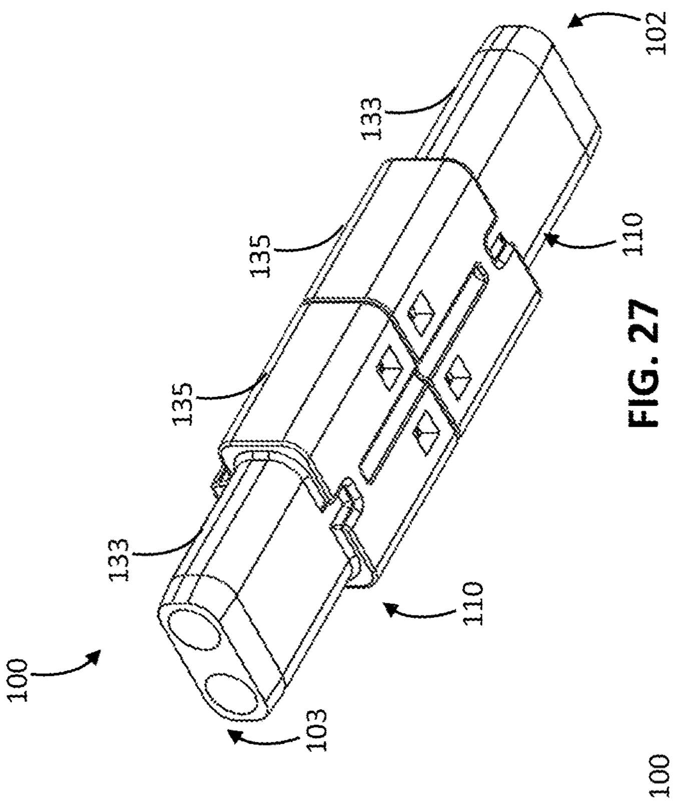
FIGS. 26-27 show alternate perspective views of the SPE connector of FIG. 1 without a shield, according to an exemplary embodiment.
Figure 26:
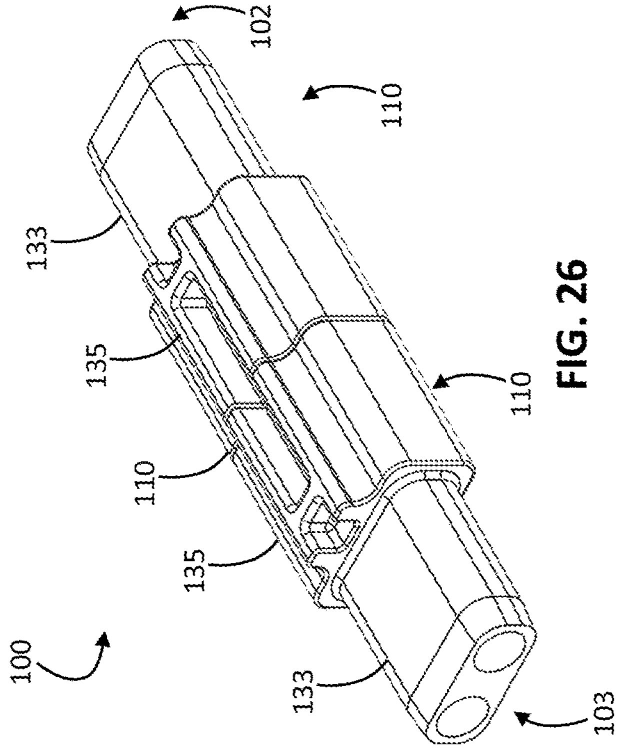
Figure 28:
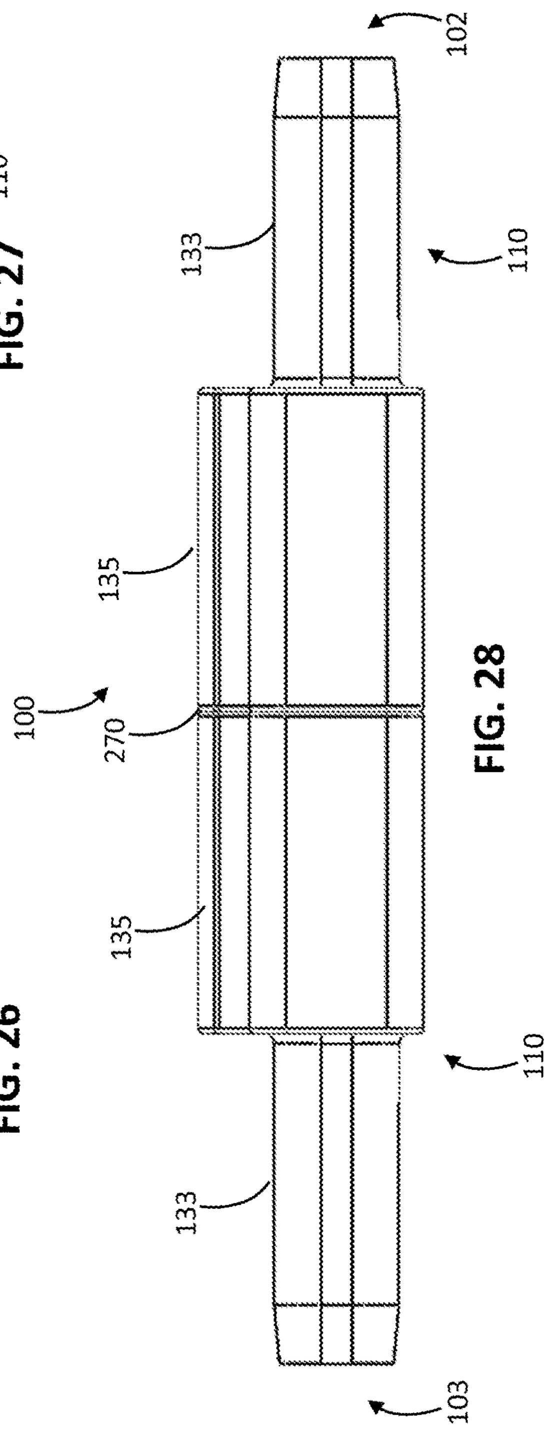
FIG. 28 is a side view of the SPE connector of FIG. 1 without a shield, according to an exemplary embodiment.

Finally, the connector 100 may be configured to facilitate connection between electrical couplings having male interfaces in the absence of the shield 105. As shown in FIGS. 26-28, the connector 100 may be assembled without the shield 105. In various embodiments, engagement of the components within the connector 100 may be facilitated by the housings 100. For example, the mating interfaces 152 of each of the mating portions 135 may be configured such that the electrical contacts 130 are friction-fit or press-fit therein. In other embodiments, the one or more protruding retention features 162 within the electrical contacts 130 may engage with one or more features of the housings 110 to prevent disengagement of the electrical contacts 130 from the housings 110. In yet other embodiments, each of the mating portions 135 of the housings may include one or more features configured to facilitate engagement between the housings 110 at a shared interface 270 (i.e., where the mating interfaces 152 of each of the housings 110 are disposed adjacent each other). In yet other embodiments, the housings 110 may be coupled to each other at the shared interface 270 using one or more adhesives and/or fasteners.

In various embodiments, the wire to wire connector may be structured to connect between two male plug connectors, where one of the connectors is rotated 180 degrees from the other (i.e., to enable signal continuity). Accordingly, the wire to wire connector may be structured to include one or more end-specific tabs or recesses (i.e., poka-yoke features) to prevent incorrect insertion of the plug connectors into the ends of the wire to wire connector.

Figure 30:
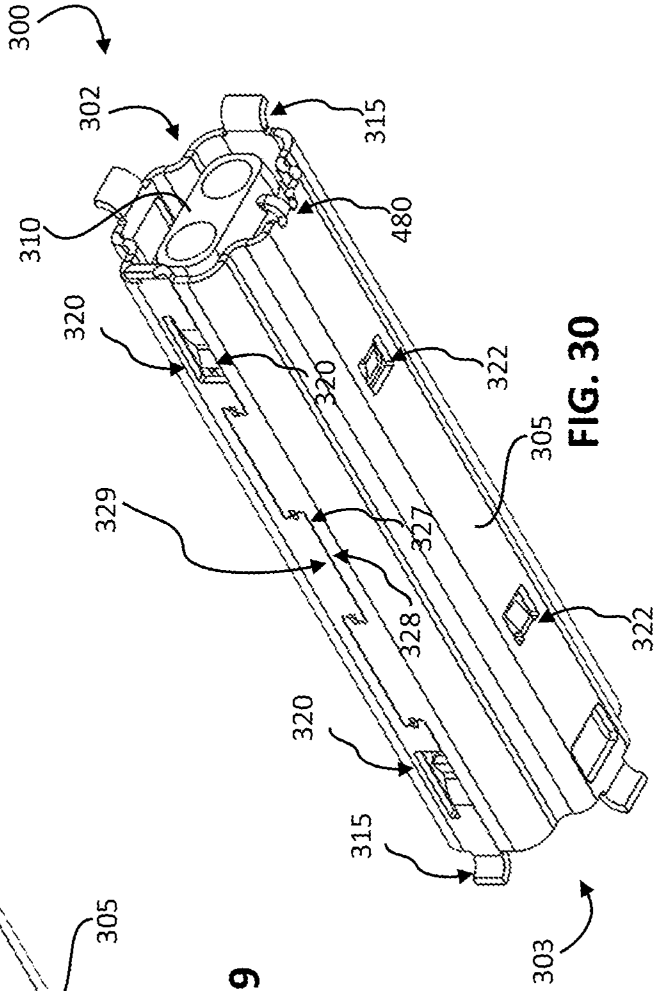
FIG. 30 is an alternate perspective view of the SPE connector of FIG. 29, according to an exemplary embodiment.
Figure 29:
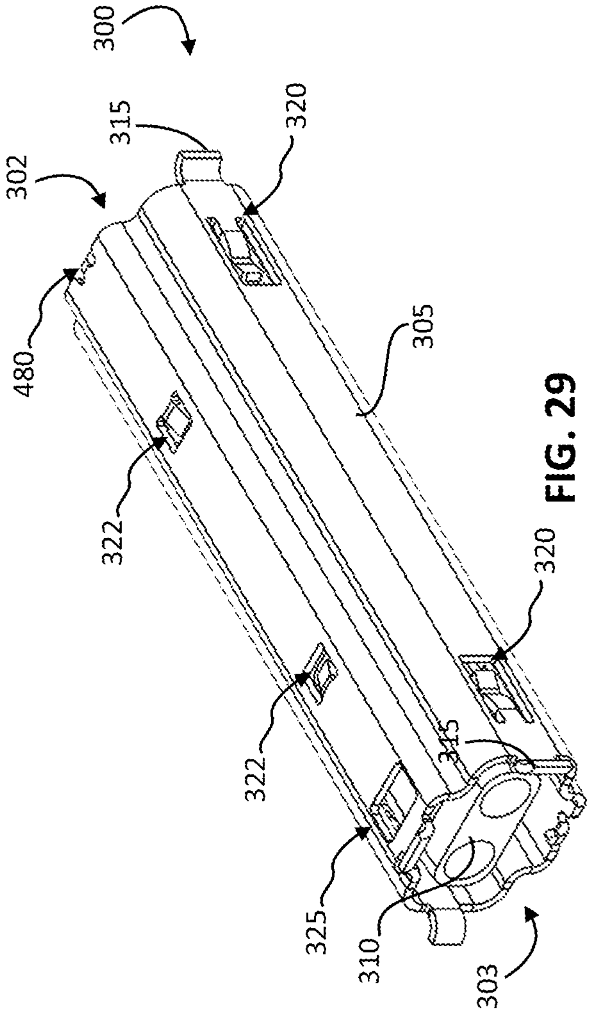
FIG. 29 is a perspective view of single pair Ethernet (SPE) connector, according to an exemplary embodiment.

FIGS. 29 and 30 show top and bottom perspective views of a wire to wire connector 300, according to an exemplary embodiment. In various embodiments, features 302-475 of the connector 300 are the same or equivalent to the features 102-275, respectively, of the connector 100. Accordingly, as shown, the connector 300 includes a shield 305 that encloses at least one housing 310, where the at least one housing 310 includes one or more electrical contacts, which facilitate an SPE connection. The connector 300 also includes one or more flanges 315 disposed at each of the first end 302 and the second end 303, which are configured to facilitate placement and retention of the wire to wire connector 300 between plug connectors. In addition, the shield 305 includes retention features 320 and 322, which are structured to prevent disengagement of the at least one housing 310 from the shield 305. The shield 305 also includes an interlocking interface 327, which is shown along a side portion of the shield 305 in FIG. 30. The interlocking interface 327 is formed by a first edge 328 of the shield 305 engaging with a second edge 329 of the shield 305. As shown, the first edge 328 includes a first edge pattern and the second edge 329 has a second edge pattern 329, which is complementary to the first edge pattern. For example, the interface 327 may include a tab and recess configuration. Accordingly, the first edge pattern of the first edge 328 engages with the second edge pattern of the second edge 329 at the interlocking interface 327, which prevents deformation of the shield 305 and/or disengagement of the shield 305 from the housings 310.

Figure 31:
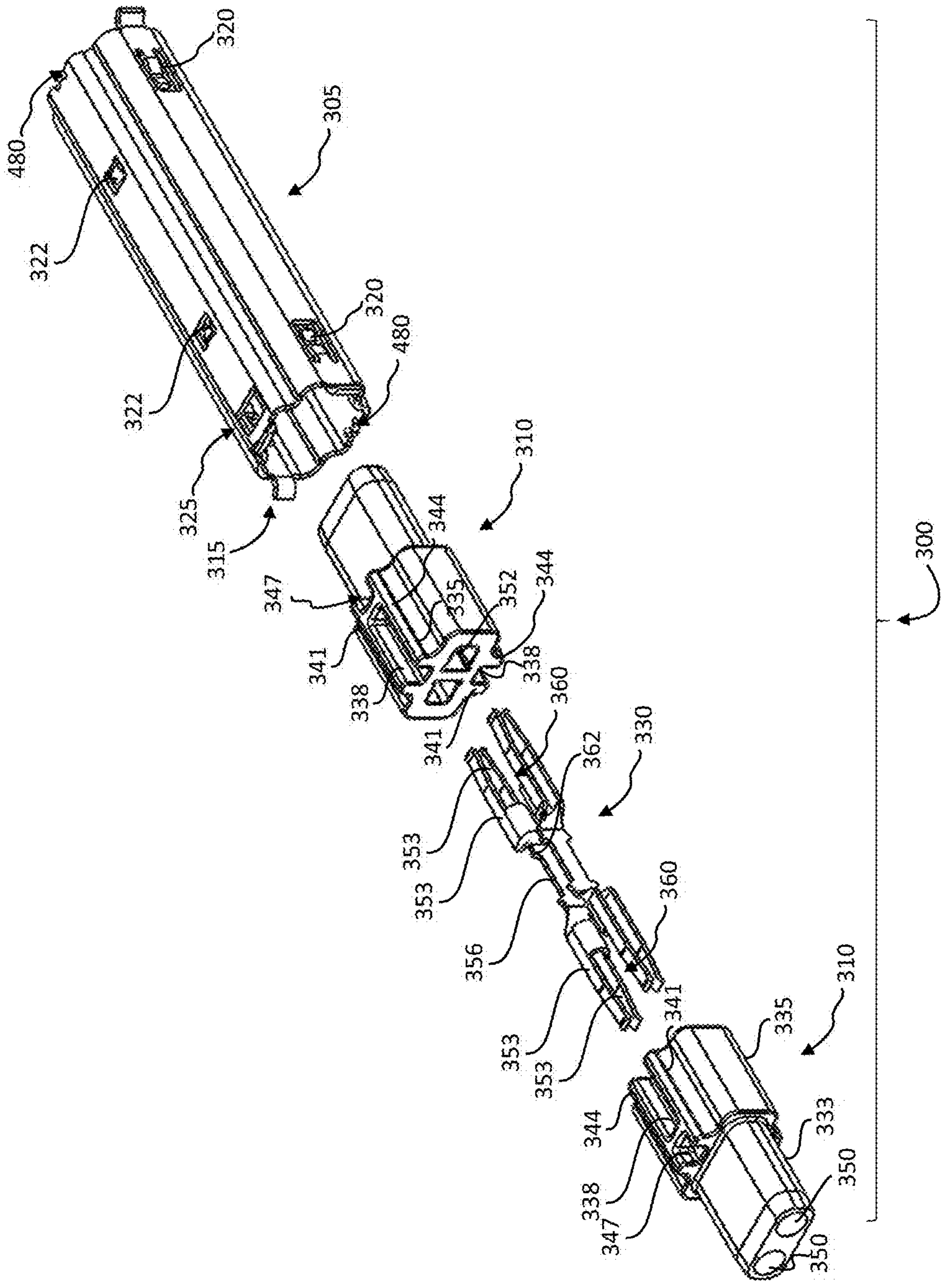
FIG. 31 is an exploded perspective view of the SPE connector of FIG. 29, according to an exemplary embodiment.

As shown in FIG. 31, the wire to wire connector 300 may be structured to include two housings 310, which are connected via the contacts 330. To enable electrical connection between the connector 300 and one or more other electrical interfaces, the electrical contacts 330 are received within the housings 310, which are then enclosed within the shield 305. As illustrated in FIG. 31, the two housings 310 are disposed in an opposing arrangement, where externally facing mating portions 333 of each of the housings 310 are positioned away from each other and inwardly facing mating portions 335 are positioned toward each other. As shown, the externally facing mating portions 333 of each of the housings 310 include a female interface and are respectively disposed near each of the ends 302, 303 of the connector 300 such that the externally facing mating portions 333 are configured to couple to an electrical connector having a male interface. The inwardly facing mating portions 335 of each of the housings, which are disposed to face each other, are each structured to receive the electrical contacts 330 therein.

As shown in FIG. 31, each of the housings 310 includes a groove 338 disposed within upper and lower portions of the inwardly facing mating portion 335. Accordingly, the housings 310 may be symmetrical about a horizontal or transverse axis. The groove 338 is defined between opposing ridges 341 and 344, and extends along the upper portion of the mating portion 335. A notch or recess 347 is also disposed within the upper portion of the mating portion 335 and is positioned adjacent the groove 338. Similar to the connector 100, when the connector 300 is fully assembled, the grooves 338 of each of the housings 310 may be configured to abut each other so as to form a continuous groove therebetween. In various embodiments, the groove 338 and the recess 347 within each of the housings 310 are structured to facilitate fit and retention within the shield 305. For example, each of the recesses 347 may engage with one or more protruding features disposed within the shield 305 (e.g., with protruding features of the retention features 322). In some embodiments, the groove 338 and the recess 347 within each of the housings 310 are structured to accommodate manufacturing considerations, which may include, but are not limited to, preventing warping from excess shrinkage within the connector 300, providing mechanical support (e.g., increasing resistance to bending or torsion) within the connector 300, and/or reducing excess material within the connector 300. For example, each of the grooves 338 disposed within the housings 310 may be structured to prevent heat sinks within the housings 310. In various embodiments, each of the housings 310 may be formed or constructed from one or more plastics, polymers, composites, or a combination thereof.

As shown in FIG. 31, each of the housings 310 includes two female mating interfaces 350 and 352, which are respectively disposed within the mating portions 333 and 335. The mating interface 350 is disposed within an outwardly facing side of the mating portion 333 and is configured to receive a male mating interface from an electrical connector. The mating interface 352 is disposed within an inwardly facing side of the mating portion 335 and is configured to receive the electrical contacts 330. As shown, each of the electrical contacts 330 includes a base 356, which is disposed between opposing contact portions 359 and 360. The contact portions 359 and 360 extend outwardly from opposite ends of the base 356 such that the contact portion 359 extends from a first side of the base 356 and the contact portion 360 extends from a second side of the base 356, where the second side is opposite the first side. Each contact portion 359, 360 includes one or more prongs or tines 353, which are structured to be received within the mating interfaces 352 of each of the housings 310. Thus, when the connector 300 is assembled, one of the housings 310 is coupled to the first contact portions 359 of each of the contacts 330 and the other of the two housings 300 is coupled to the second contact portions 360 of each of the contacts 330. In various embodiments, each of the electrical contacts 330 may include one or more protruding retention features 362 disposed within the base 356, which may be configured to facilitate retention of the contacts 330 within the housings 310. In various embodiments, the outer edges of the base 356 may prevent over-insertion of the prongs 353 into the mating interfaces 352 (e.g., by making contact with or abutting against one or more features within the housings 310).

Figure 33:
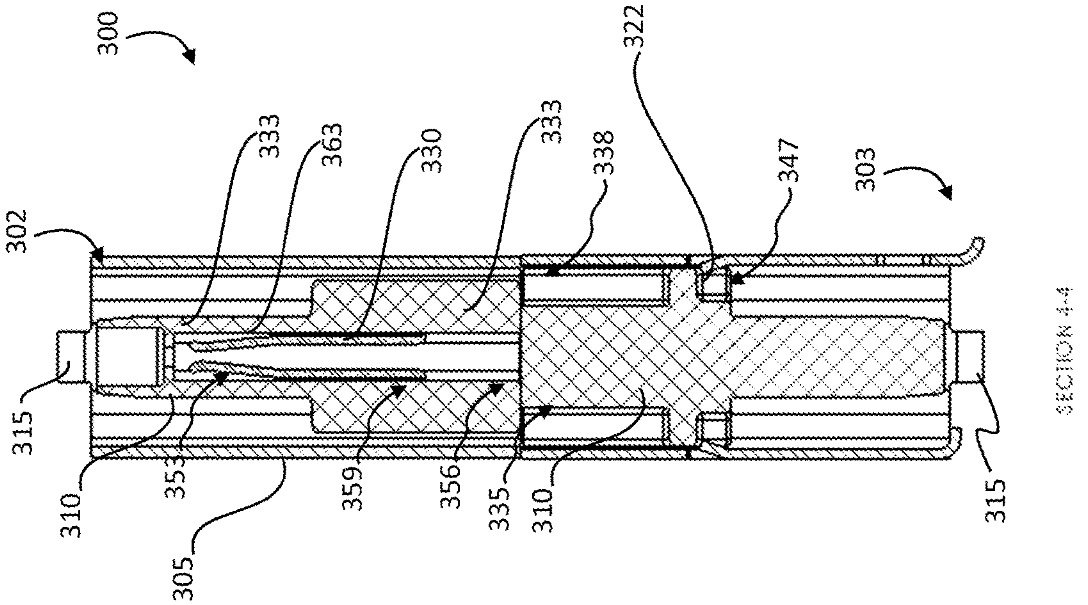
FIG. 33 is a sectional view of the SPE connector of FIG. 32 taken along line 32-32 of FIG. 32, according to an exemplary embodiment.
Figure 32:
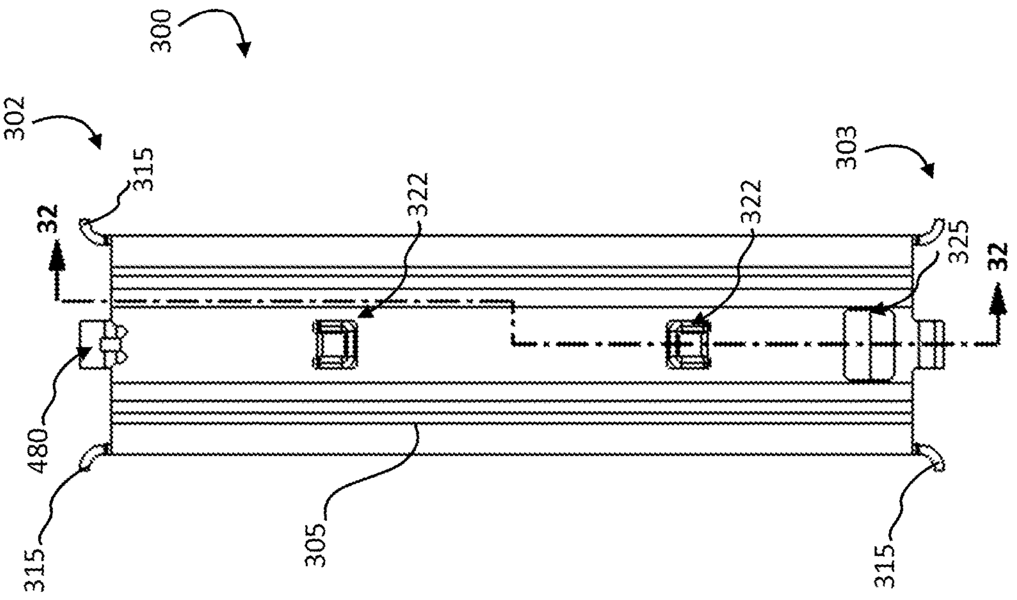
FIG. 32 is a top view of the SPE connector of FIG. 29, according to an exemplary embodiment.

FIGS. 32 and 33 show top and sectional views, respectively, of the connector 300, according to an exemplary embodiment. As illustrated in FIG. 32, when the connector 300 is assembled, the housings 310 do not protrude past the edges of the shield 305. In addition, each of the flanges 315 may extend outward from the shield 305, which may guide coupling of the connector 300 to one or more wires, electrical connectors or interfaces, etc. As shown, each of the flanges 315 may bent or curved such that each flange extends away from an outer surface defined by the shield 305. In various embodiments, each of the flanges 315 may extend outward from the shield 305 in a first direction substantially parallel with a length of the shield 305 (i.e., extending past the ends 302, 303 in a generally horizontal direction) and in a second direction substantially perpendicular with the length of the shield 305. In various embodiments, a length, width, and/or degree of curvature of each of the flanges 315 may be based on a length of the connector 300 and/or based on a thickness of the material used to produce the shield 305. When assembled, the various components of the connector 300 mutually engage to prevent disassembly of the connector 300 during use. In some embodiments, the shield 305 may be formed without the flanges 315. As shown in FIG. 33, which is a sectional view of the connector 300 taken along line 32-32 of FIG. 32, the housings 310 are arranged within the connector 300 such that the mating portions 335 of each housing 310 are abutting, and the mating portions 333 are positioned at the ends 302 and 303 of the connector 300. The housings 310 are retained within the shield 305 by the retention features 322, which may engage with the recesses 347 disposed within the housings 310. As shown, the housings 310 also include an internal channel 363 (which extends from the mating interface 352 disposed within the mating portion 335). Accordingly, when the connector 300 is assembled, the prongs 353 are disposed within the internal channel 363 such that when another wire or connector having a male interface is coupled to the connector 300 via the mating interface 350, the prongs 353 facilitate an electrical connection therebetween.

Figure 34:
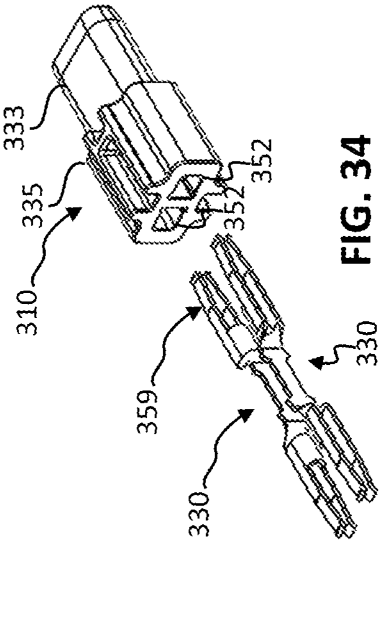
FIGS. 34-39 show perspective views of assembly stages for the SPE connector of FIG. 29, according to an exemplary embodiment.
Figure 35:
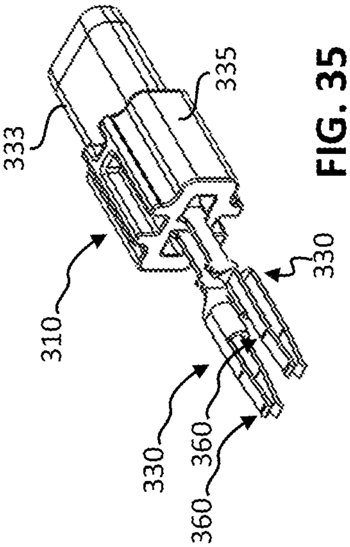
Figure 36:
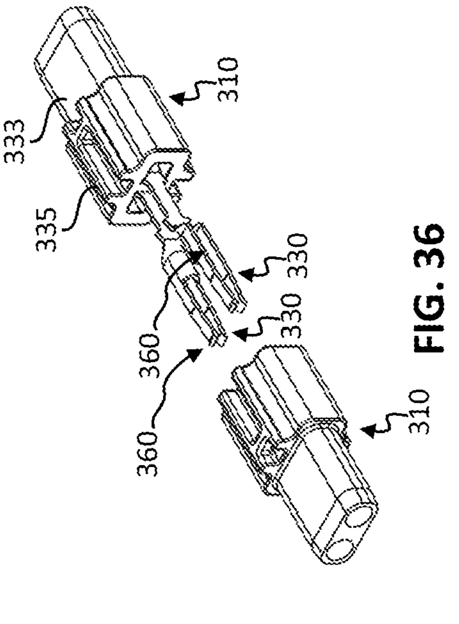
Figure 37:
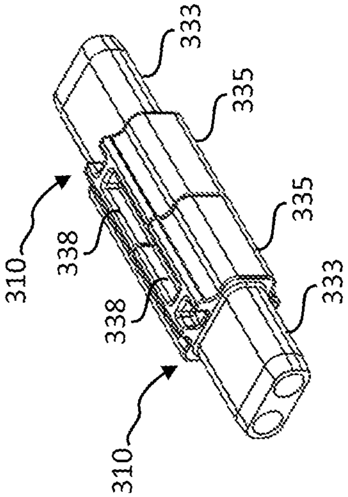
Figure 39:
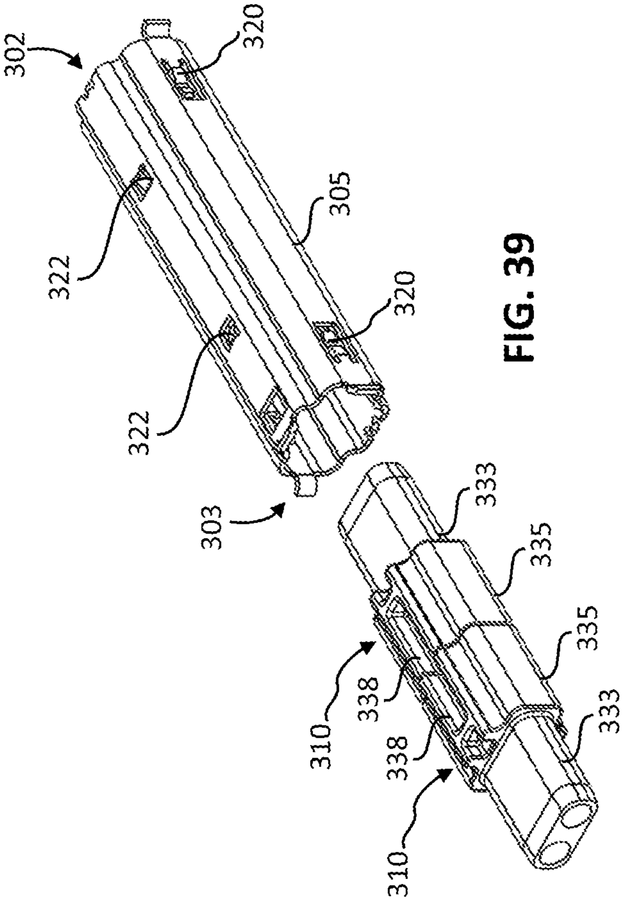
Figure 38:
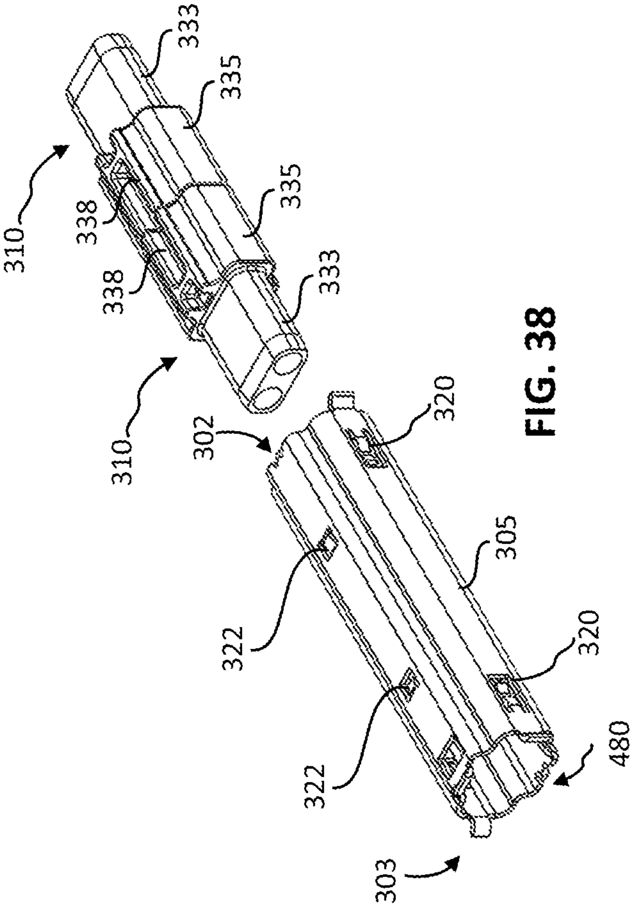

FIGS. 34-39 show perspective views of show stages of assembling the connector 300, according to various exemplary embodiments. As shown in FIG. 34, two electrical contacts 330 are positioned relative to a housing 310 such that the contact portions 359 (or alternatively, the contact portions 360) of each contact 330 are aligned with the mating interface 352. As illustrated, the connector 300 is structured such that the contacts 330 are inserted into the housings 310 at an angle that is 90 degrees rotated from the angle of insertion of the contacts 130 into the housings 110 of the contact 100. Once aligned, the contact portions 359 of each of the electrical contacts 330 are inserted into the mating portion 335 of the housing 310 via the mating interface 352, as shown in FIG. 35. After the contact portions 359 of each electrical contact 330 are inserted into the housing 310, the contact portions 360 of each electrical contact 330 may then be aligned with the mating interface 352 of a second housing 310, as shown in FIG. 36. Once aligned, the contact portions 360 of the at least one electrical contact 330 are inserted into the mating portion 335 of the second housing 310 via the corresponding mating interface 352, as shown in FIG. 37. As shown, when the electrical contacts 330 are inserted into both housings 310, the mating portions 335 (and the groove 338 disposed therein) of each housing 310 are directly adjacent such that they may physically contact each other. Once the electrical contacts 330 are inserted into both housings 310, the resulting assembly may then be inserted into the shield 305 at either of the ends 302, 303, as shown in FIGS. 38 and 39. In various embodiments, the connector 300 is held together by the housings 310. In some embodiments, the mating interfaces 352 of each of the mating portions 335 may be configured such that the electrical contacts 330 are friction-fit or press-fit therein. Additionally or alternatively, the shield 305 is configured to prevent disengagement of the connector 300 components, such as via a friction-fit between an inner surface of the shield 305 and an outer surface of the housings 300. In other embodiments, the retention features 322 of the shield 305 may engage with the housings 310 and prevent disengagement thereof.

Figure 41:
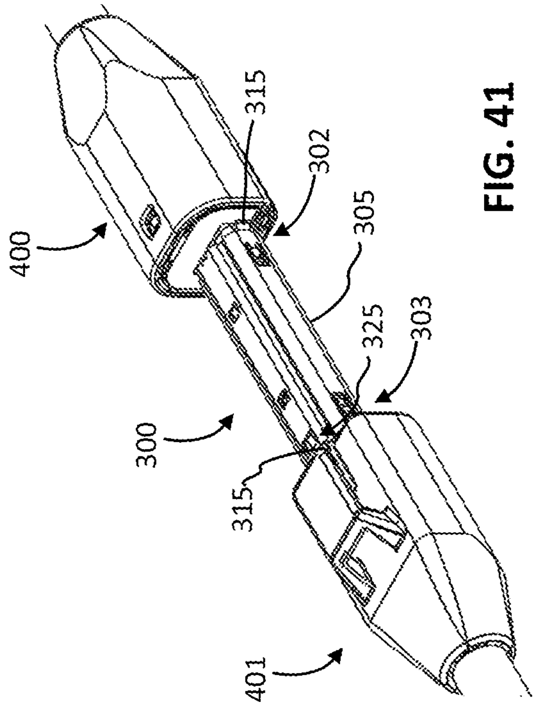
FIGS. 40-41 show top and bottom views, respectively of connecting the SPE connector of FIG. 29 between two plug connectors, according to various exemplary embodiments.
Figure 40:
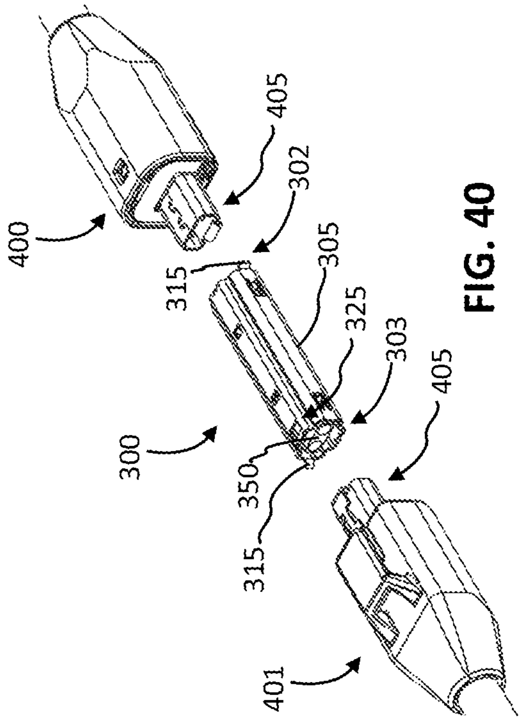

Once assembled, the connector 300 may then be used to facilitate connection between two wires or plug connectors having male interfaces. As shown in FIG. 40, the ends 302, 303 of the assembled connector 300 may be aligned with male interfaces 405 of first and second plug connectors 400, 401 (e.g., from an SPE cable). Accordingly, the male interface 405 of the first plug connector 400 may be aligned with the first end 302 of the connector 400 and the male interface 405 of the second plug connector 400 may be aligned with the second end 303 of the connector 300. Once aligned, the male interfaces 405 of each plug connector 400, 401 may respectively engage with the female interfaces 350 of each housing 310 disposed on each of the ends 302, 303 of the connector 300. Once the connector 300 and the plug connectors 400, 401 are connected, as shown in FIG. 41, protruding features 410 disposed on, near, or adjacent to the male interfaces 405 may engage with the recesses 325 disposed near each of the ends 302, 303 to prevent disengagement of the connector 300 from the plug connectors 400, 401. In various embodiments, the retention features 320 of the shield 305 may facilitate retention (e.g., via friction fit) of the plug connectors 400, 401 within the connector 300. As shown in FIGS. 40 and 41, the second plug 402 may be rotated 180 degrees (i.e., flipped) relative to the first plug 401 (or vice versa). In various embodiments, such an arrangement may facilitate same-signal continuity. In other embodiments, the first and second plugs 401, 402 may not be flipped relative to each other (i.e., the first and second plugs 401, 402 may have a similar or same arrangement to that of the plugs 201, 202).

Figure 44:
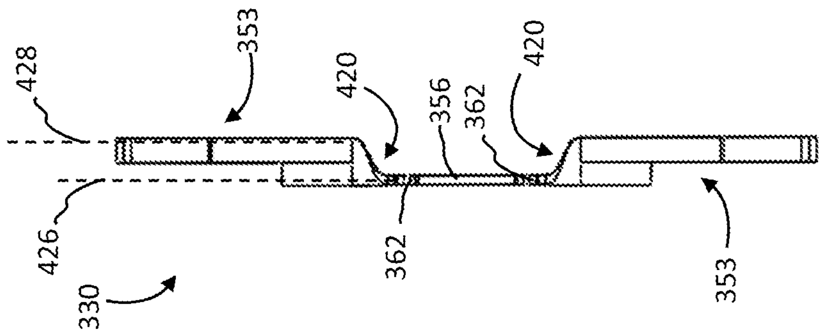
FIG. 44 is an alternate side view of the electrical contact of FIG. 42, according to an exemplary embodiment.
Figure 43:
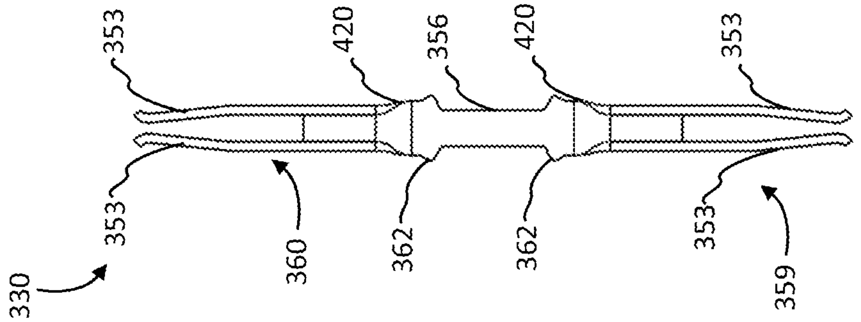
FIG. 43 is a side view of the electrical contact of FIG. 42, according to an exemplary embodiment.
Figure 42:
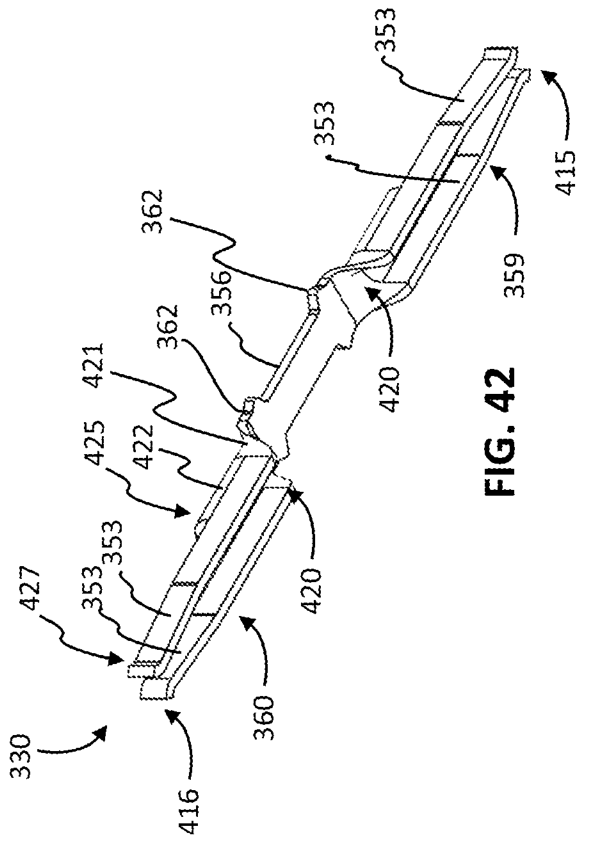
FIG. 42 is a top view of an electrical contact included within the SPE connector of FIG. 29, according to an exemplary embodiment.

FIGS. 42-44 show perspective, top, and side views, respectively, of the electrical contact 330, according to an exemplary embodiment. As shown, each of the prongs 353 within each contact portion 359, 360 is integrally formed with the base 356 via transition sections 420. In various embodiments, the transition sections 420 may be curved, angled, or contoured such that a plane 428 defined by the prongs 353 within each respective contact portion 359 and 360 are offset from a plane 426 defined by the base 356. In various embodiments, the contact portions 359 and 360 may define two separate planes, which are further offset from each other. As shown in FIG. 42, each transition section 420 includes an inclined portion 421, which is generally angled upward from the base 356. The inclined portion 421 is integrally formed with a U-shaped portion 422, where opposing edges of the transition section 420 are curved inward toward each other. In some embodiments, an amount of offset between the planes 426 and 428 may be based on a housing configuration. In other embodiments, the amount of offset may be based on a type of SPE (or other connector type) connection (e.g., an SPE connection according to standard IEC 63171-6, etc.). In various embodiments, the electrical contact 330 may include at least one prong 353 disposed within each contact portion 359 and 360. Although FIGS. 42-44 show the electrical contact including two prongs 353 within each contact portion 359, 360, the electrical contact 330 may include a single prong 353, three prongs 353, or any number of prongs 353. Accordingly, as shown in FIGS. 42 and 43, within each contact portion 359 and 360, the two prongs 353 curve or bend inward towards each other. Each of the contacts 330 may be produced by first stamping a sheet of electrically conductive material (e.g., metal or metallic alloy), bending the first and second contact portions 359, 360 to be offset from the base 356 (thus forming the inclined portions 421), and folding the prongs 353 within each of the contact portions 359, 360 (thus forming the U-shaped portions 422) such that the prongs 353 are in a mirroring configuration relative to a lengthwise central axis of the electrical contact 330. In some embodiments, terminal ends 415, 416 of the prongs 353 may be curved outward (i.e., away from a longitudinal axis of the contact 330) to facilitate retention and/or engagement within the housings 310.

As described above, the electrical contact 330 may include one or more retention features 362 disposed within the base 356 to prevent or resist disengagement of the electrical contact 330 from the housings 310. In various embodiments, the one or more retention features 362 may be formed by cutting, stamping, or otherwise machining the base 356 to form one or more ridges or barbs that protrude therefrom, as shown in FIGS. 42 and 43. In various embodiments, the one or more retention features 362 may form triangular peaks, rectangular ridges, pointed ends, rounded ends, or any other suitable shape that would facilitate engagement between the contact 330 and the housings 310. Although FIGS. 42 and 43 show the base 356 having 4 retention features 362, various embodiments of the electrical contact 130 may include any number (e.g., one, three, four, six, etc.) of retention features 362 disposed within the base. In various embodiments, the retention features 362 may be arranged on opposing sides of the base 356, where each retention feature 362 extends away from the base in a direction that is generally parallel with the plane 426 defined by the base 356 and perpendicular to an axis defined by the contact ends 359 and/or 360. In some embodiments, the retention features 362 may be arranged such that a pair of retention features 362 are disposed adjacent the transition section 420 between the base 356 and the contact end 359 and a pair of retention features 362 are disposed adjacent the transition section 420 between the base 356 and the contact end 360. In some embodiments, the retention features 362 may be disposed in a same plane as the base 356. In other embodiments, the retention features 362 may curve or otherwise be offset from the base 356. In yet other embodiments, each of the retention features 362 may be in a same plane. In various embodiments, the retention features 362 may be arranged in one or more different planes.

Figure 46:
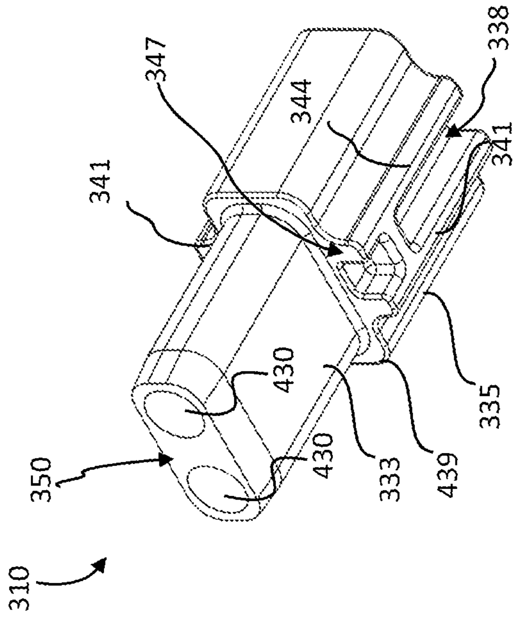
FIGS. 45-47 are alternate perspective views of a housing included within the SPE connector of FIG. 29, according to an exemplary embodiment.
Figure 47:
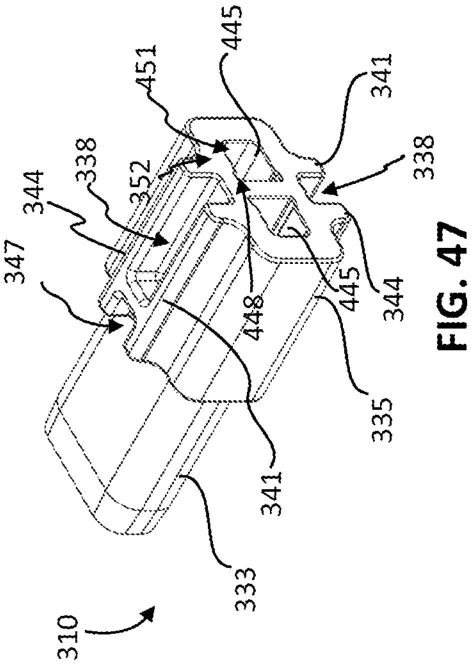
Figure 45:
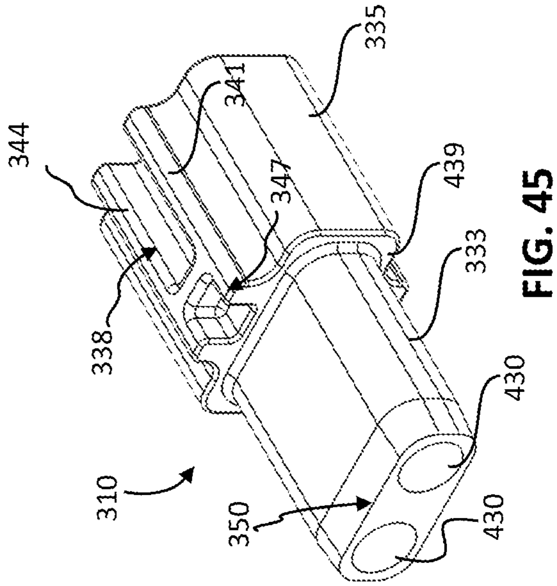
Figure 51:
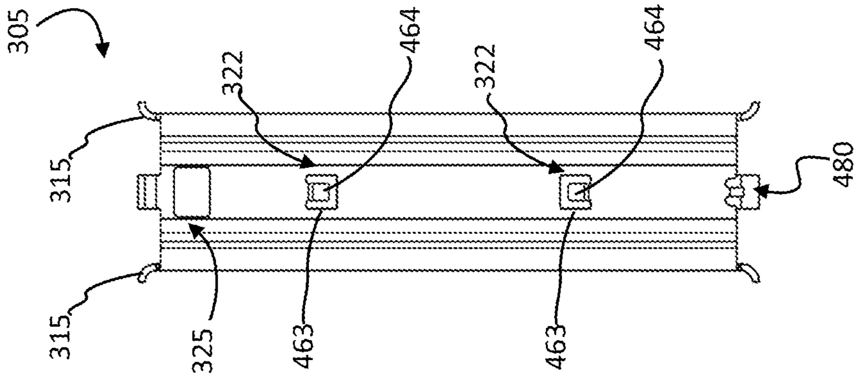
FIGS. 49-51 are side, top, and bottom views, respectively, of the shield of FIG. 48, according to an exemplary embodiment.
Figure 50:
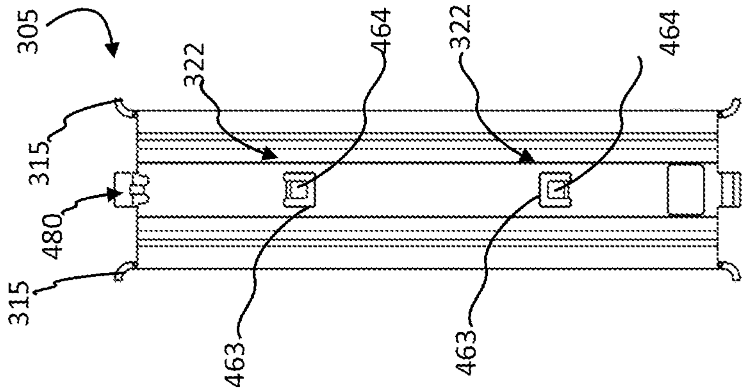

FIGS. 45-47 show alternate perspective views of the housing 310, according to an exemplary embodiment. As described above, the housing 310, which is configured to electrically insulate the electrical contacts 330, includes two mating portions 333, 335, which each have the corresponding mating interfaces 350 and 352, respectively. The mating interface 350 may include one or more recesses or orifices 430, which are each configured to receive a male interface (or portion thereof) from another wire, electrical connector, or interface (e.g., plug connector 400 or 405). Although FIGS. 45-47 show the orifices 430 as generally cylindrical in shape, the orifices 430 may have any suitable shape for receiving a male interface or male interface portion therein. Similarly, the mating interface 350 within the mating portion 335 of the housing may include one or more recesses or orifices 445, which are configured to receive the electrical contact 330. To accommodate both the prongs 353 and the base 356 of the electrical contact 330, each orifice 445 within the mating interface 352 may include a thin slot 448, which is shaped to receive a portion of the base 356. The orifice 445 may also include a second slot 451, which is disposed directly adjacent to the slot 448, and which has a smaller height and greater width than the slot 448 to facilitate receiving the prongs 353 of the electrical contact 330. Accordingly, as shown and described, the orifice 445 is arranged to accommodate the contacts 330 in an orientation that is rotated 90 degrees relative to the contacts 130, which are received in the orifice 245. In various embodiments, the orifices 445 may be sized, shaped, or positioned in any suitable manner necessary to enable insertion of the electrical contacts 330 for facilitating an SPE connection using the connector 300. In various embodiments, a thickness of the electrical contact 330 material may be approximately 0.25 inches. In other embodiments, the thickness of the electrical contact 330 may be based on desired radiofrequency (RF) capabilities.

The housing 310 may also be sized or shaped to facilitate ease of connection between the connector 300 and one or more plug connectors (e.g., connectors 401, 402), and to facilitate retention of the housing 310 within the shield 305. As illustrated in FIGS. 45 and 46, the housing 310 is structured to be symmetrical about a transverse axis. Accordingly, the housing 310 includes grooves 338 disposed on both a top portion and bottom portion of the housing 310, where the grooves 338 are each defined between the opposing ridges 341 and 344. In addition, each of the bottom and top portions of the housing 310 include a recess 347, which is disposed adjacent the groove 338. Accordingly, the housing 310 is structured to avoid a need to insert the housing 310 into the shield 305 at a particular orientation. The symmetrical design of the housing 310 allows for the housing 310 to be inserted and retained within the shield 305 regardless of whether the housing 310 is arranged such that the bottom portion is adjacent a top portion of the shield or vice versa. In addition, and as shown in FIGS. 45-47, the housing 310 may be shaped such that the mating portion 335 is greater in width and/or height as compared to the mating portion 333. Accordingly, the mating portions 333 and 335 may form a ridge 439 therebetween. In various embodiments, the housing 310 may be produced via molding, thermoforming, or any other suitable fabrication method. In various embodiments, the mating portions 333, 335 and the ridge 439 may be formed based on one or more International Electrotechnical Commission (IEC) standards (e.g., IEC spec 63171-6).

Figure 48:
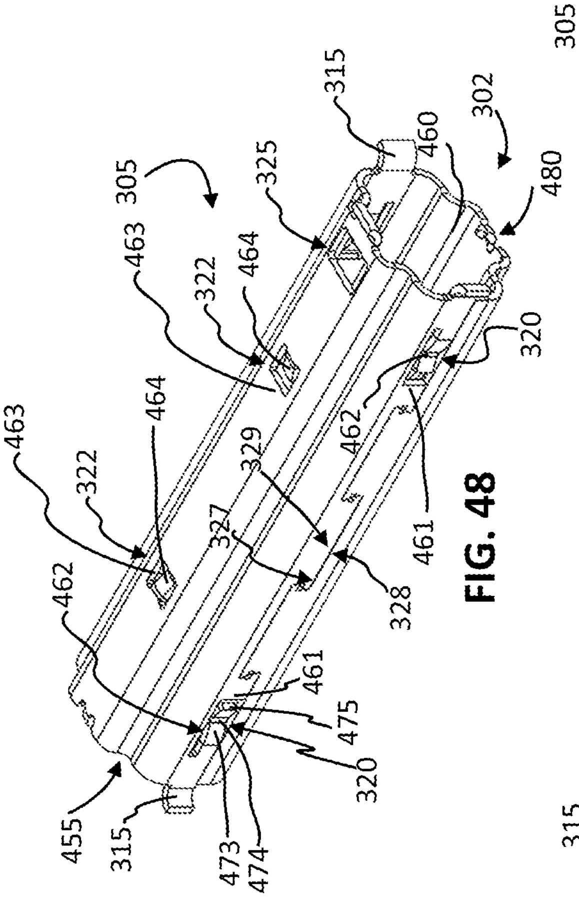
FIG. 48 is a perspective view of a shield included within the SPE connector of FIG. 29, according to an exemplary embodiment.
Figure 49:
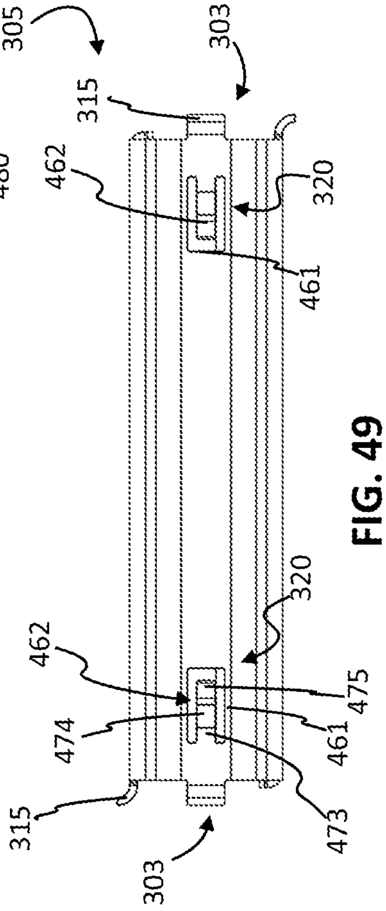

FIGS. 48-51 show perspective, side, bottom, and top views of the shield 305, according to an exemplary embodiment. As described above, the shield 305 is configured to enclose the housings 310 and electrical contacts 330. The shield 305 is generally formed as a tubular structure having a central bore 460, and terminating at the opposing ends 302 and 303. The shield 305 may have a generally rectangular shape. In various embodiments, the shield 305 may be contoured to conform or be generally complementary to a shape of the housings 310, which are enclosed therein. As shown in FIG. 48, the shield 305 may include one or more curved region 455, which are formed to match a contour of the housings 310. The shield 305 may be produced by cutting sheet material (e.g., metal or metallic alloy) to a predetermined size, forming retention features 320, 322, and recesses 325 by stamping or cutting, and forming the sheet material into the desired shape (i.e., where the desired shape matches the shape and/or contour of the housings 310). Terminal ends of the shield 305 may be cut or otherwise modified to form an interlocking pattern. As described above, the shield 305 includes an interlocking interface 327. The interlocking interface 327 is formed by the first edge 328 of the shield 305 engaging with the second edge 329 of the shield 305. As shown, the first edge 328 includes a first edge pattern and the second edge 329 has a second edge pattern 329, which is complementary to the first edge pattern. Accordingly, the first edge pattern of the first edge 328 engages with the second edge pattern of the second edge 329 at the interlocking interface 327, which prevents deformation of the shield 305 and/or disengagement of the shield 305 from the housings 310. For example, because the shield 305 may be formed from sheet metal, the shield 305 may be subject to an amount of spring-back (or other internal stresses) that could cause the shield 305 to deform or become misshapen. Accordingly, the interlocking pattern formed between the edges 328, 329 prevents the shield 305 from separating at the edges 328, 329 and ensures that the shield 305 retains a shape and structure complementary to that of the housings 310. As shown in FIGS. 48-51, the shield 305 may be formed such that the interlocking interface 327 may be disposed along a side of the shield 305. In other embodiments, the shield 305 may be formed such that the interlocking interface 327 is disposed along a top or bottom portion of the shield 305 (i.e., in a manner that is the same as or similar to that of the interlocking interface 127 of the shield 105).

As described above, the retention features 320, 322 and the recesses 325 may be stamped or cut within the shield 305. In various embodiments, the retention features 320 and/or 322 may include one or more formed elastic members, which are configured to apply a compressive force on the housings 310 contained within the shield 305 to prevent sliding or dislodging of the housings 310. In various embodiments, the retention features 320 and/or 322 may additionally or alternatively include one or more protruding portions, which are adapted to engage with corresponding recesses (e.g., recess 347) within the housings 310. In various embodiments, the retention features 320 may be configured to engage with one or more retention features of another connector coupled to the connector 300 (e.g., the connectors 401, 402). For example, the retention features 322 may engage with the housings 310 within the shield 305, and the retention features 320 may engage with the connectors 401, 402 to prevent disengagement of the connector 300 from the connectors 401, 402.

In various embodiments, the retention features 320 may be formed by cutting or stamping to produce a tab or cantilevered portion 462 extending from a surface 461 on the side of the shield 305. Similar to the cantilevered portions 262 of the connector 100, each cantilevered portion 462 within each of the retention features 320 may be formed to have a first region 473, which is bent or curved inward away from the surface 461 and into the bore 460. The first region 473 may be integrally formed with a second region 475, which is bent or curved outward toward the surface 461 and away from the bore 460. An intermediate region 474 is disposed between the first and second regions 473, 475, where the intermediate region 474 is disposed closer to a center of the bore 460 compared to either of the first and second regions 473, 475. In various embodiments, the cantilevered portion 462 may be preloaded or otherwise configured such that the intermediate region 474 is configured to apply a compressive force on the housings 310 when the connector 300 is assembled, or on the plug connectors 401, 402 when the connector 300 is coupled thereto. In various embodiments, the retention features 320 may be configured to engage with one or more corresponding recesses disposed within the plug connectors 401, 402 such that when the connector 300 is coupled to the plug connectors 401, 402 the retention features 320 may prevent disengagement. In some embodiments, the retention features 320 may also facilitate disengagement of the plug connectors 401, 402 from the connector 300. For example, when the connector 300 is coupled to the plug connectors 401, 402, the second region 475 within each retention feature may be pressed to release engagement between the retention features 320 and the plug connectors 401, 402 and the retention features 320.

In various embodiments, the retention features 322 may be formed by cutting or stamping to produce a tab or cantilevered portion 464 extending from a surface 463 defined by a top (or bottom) of the shield 305. Each cantilevered portion 464 within each of the retention features 322 may be bent or curved inward away from the surface 463 and into the bore 460. A distal end of the cantilevered portion 464 furthest from the surface 463 may engage with the recess 347, which is disposed within each housing 310. In various embodiments, the cantilevered portions 464 may be shaped to prevent disengagement of the housings 310 from the shield 305 once the connector 300 is assembled. In various embodiments, each of the top and bottom of the shield 305 may include two retention features 322 (as shown). In other embodiments, each of the top and bottom of the shield 305 may include any number (e.g., two, four, six, nine, etc.) of retention features 362.

In various embodiments, the retention features 320 may be disposed at a same distance from the ends 302, 303 as the retention features 322. In other embodiments, each retention feature 320 may be disposed at a first distance from the ends 302, 303, and each retention feature 322 may be disposed at a second distance from the ends 302, 303. In yet other embodiments, a distance between the end 302 and a closest retention feature 320 and/or 322 may be different than a distance between the end 303 and a closest retention feature 320 and/or 322. For example, the retention feature 320 (or the retention feature 322) nearest the end 303 may be disposed at a distance that is greater or less than a distance between the retention feature 320 (or the retention feature 322) nearest the end 302 and the end 302. In various embodiments, the shield 305 may be additionally or alternatively configured to engage with plug connectors coupled to the connector 300 (e.g., plug connectors 401, 402) via the recesses 325 and/or the flanges 315.

In some embodiments, the shield 305 may be structured to ensure a specific connection orientation (i.e., when connected between the connectors 401, 402). As described above, the connector 300 may be coupled between connectors 401, 402 such that one of the connectors 401, 402 is disposed in a first orientation and the other of the connectors 401, 402 is disposed in a flipped orientation relative to the first orientation. To reduce risk of error in coupling of the connector 300 to the plug connectors 401, 402, the shield 305 may be structured to include one or more placement features (i.e., poka-yoke features) 480, such as one or more tabs or recesses, to ensure a particular coupling orientation. Accordingly, as shown in FIGS. 48-51, the shield 305 may include the placement features 480 within a top portion of the end 303, positioned opposite a recess 325, which is disposed within a bottom portion of the end 303 of the shield 305. Similarly, the shield 305 may include the placement features 480 within a bottom portion of the end 302, positioned opposite a recess 325, which is disposed within a top portion of the end 302 of the shield 305. In other embodiments, the placement features 480 may be disposed within a bottom portion of the end 303 and a top portion of the end 302. As shown, the placement features 480 may include one or more tabs extending outwardly from the ends 302, 303 of the shield 305. Accordingly, the placement features 480 may engage with one or more corresponding features of the connectors 401, 402 (i.e., like puzzle pieces) to ensure a particular orientation of the connectors 401, 402 when coupled to the connector 300.

Figure 53:
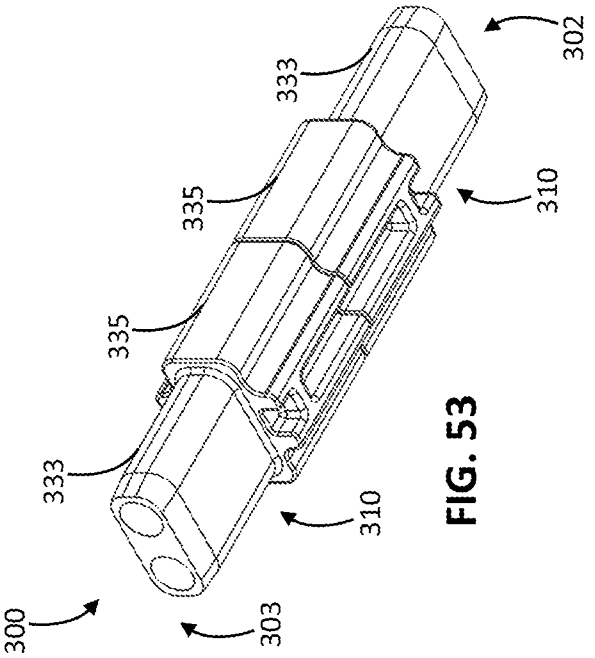
FIGS. 52-53 show alternate perspective views of the SPE connector of FIG. 29 without a shield, according to an exemplary embodiment.
Figure 52:
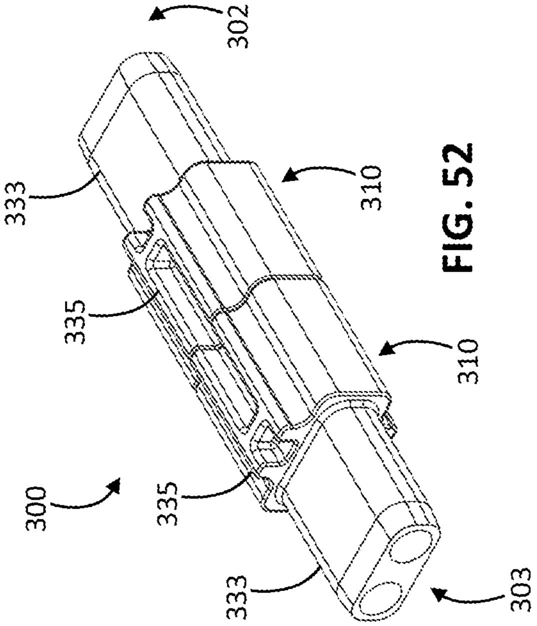
Figure 54:
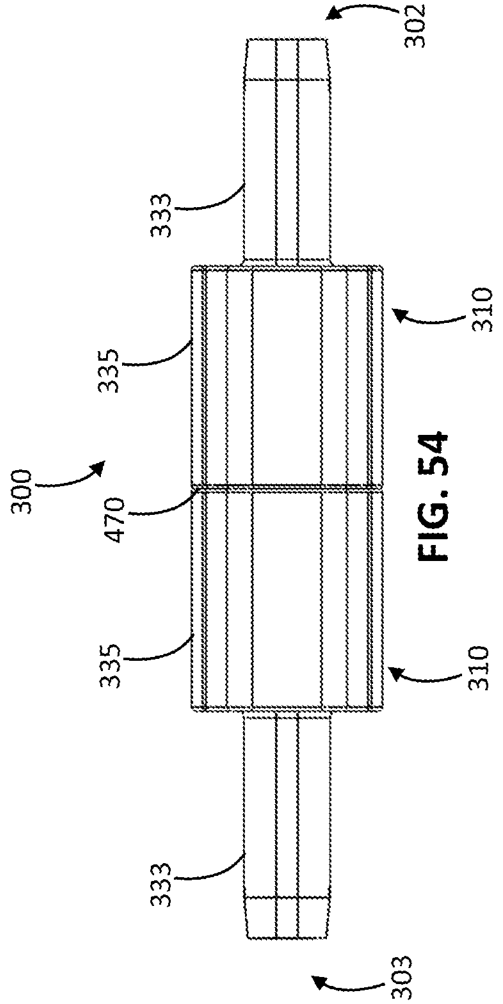
FIG. 54 is a side view of the SPE connector of FIG. 29 without a shield, according to an exemplary embodiment.

Finally, the connector 300 may be configured to facilitate connection between electrical couplings having male interfaces in the absence of the shield 305. As shown in FIGS. 52-54, the connector 300 may be assembled without the shield 305. In various embodiments, engagement of the components within the connector 300 may be facilitated by the housings 300. For example, the mating interfaces 352 of each of the mating portions 335 may be configured such that the electrical contacts 330 are friction-fit or press-fit therein. In other embodiments, the one or more protruding retention features 362 within the electrical contacts 330 may engage with one or more features of the housings 310 to prevent disengagement of the electrical contacts 330 from the housings 310. In yet other embodiments, each of the mating portions 335 of the housings may include one or more features configured to facilitate engagement between the housings 310 at a shared interface 470 (i.e., where the mating interfaces 352 of each of the housings 310 are disposed adjacent each other). In yet other embodiments, the housings 310 may be coupled to each other at the shared interface 470 using one or more adhesives and/or fasteners.

Notwithstanding the embodiments described above in reference to FIGS. 1-54, various modifications and inclusions to those embodiments are contemplated and considered within the scope of the present disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A single pair Ethernet (SPE) connector comprising:
a first housing and a second housing;
a first electrical contact and a second electrical contact; and
a shield configured to encase the connected first housing and second housing;
wherein each of the first housing and the second housing comprises:
a first mating portion and a conjoined second mating portion, the first mating portion having a female interface disposed on a first side and the second mating portion extending in a direction opposite the first side;
wherein each of the first and second electrical contacts comprises:
a base having a first end and a second end opposite the first end;
a first contact portion extending from the first end of the base; and
a second contact portion extending from the second end of the base; and
wherein the female interface on the first side of the first housing is configured to receive the first contact portion of each of the first and second electrical contacts and the female interface on the first side of the second housing is configured to receive the second contact portion of each of the first and second electrical contacts.

2. The SPE connector of claim 1, wherein the base further comprises at least one retention feature, and wherein a first plane defined by the first and second contact portions is offset from a second plane defined by the base.

3. The SPE connector of claim 1, wherein the first mating portion comprises a recess disposed within an upper portion of the first mating portion adjacent the second mating portion and a groove extending from the recess to the first side.

4. The SPE connector of claim 3, wherein when the first and second contact portions of each of the first and second electrical contacts are respectively received within the female interface on the first side of each of the first housing and the second housing, the groove of the first mating portion of the first housing abuts the groove of the first mating portion of the second housing.

5. The SPE connector of claim 3, wherein the shield comprises a first retention feature disposed within a top portion of the shield at a first distance from a first end and a second retention feature disposed within the top portion of the shield at a second distance from a second end, and wherein the first retention feature is configured to engage with the recess of the first mating portion of the first housing and the second retention feature is configured to engage with the recess of the first mating portion of the second housing.

6. The SPE connector of claim 5, wherein the shield further comprises a third retention feature and a fourth retention feature disposed within a bottom portion of the shield, the third retention feature disposed at a third distance from the first end and the fourth retention feature disposed at a fourth distance from the second end.

7. The SPE connector of claim 5, wherein each of the first retention feature and the second retention feature include at least one aperture disposed through the shield.

8. The SPE connector of claim 1, wherein the shield comprises at least one flange disposed at each of a first end and a second end opposite the first end, the at least one flange configured to engage with a plug connector having a male mating interface.

* * * * *